(12) United States Patent
Wang et al.

(10) Patent No.: US 10,751,982 B2
(45) Date of Patent: Aug. 25, 2020

(54) METHODS AND APPARATUS TO REMOVE GAS AND VAPOR FROM A PANEL FOR A DECORATIVE LAYER

(71) Applicant: The Boeing Company, Chicago, IL (US)

(72) Inventors: Xiaoxi Wang, Mukilteo, WA (US); John Wilde, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 15/153,338

(22) Filed: May 12, 2016

(65) Prior Publication Data
US 2017/0326859 A1    Nov. 16, 2017

(51) Int. Cl.
*B32B 37/00* (2006.01)
*B30B 15/00* (2006.01)
(Continued)

(52) U.S. Cl.
CPC ............ *B32B 37/003* (2013.01); *B27N 7/005* (2013.01); *B29C 37/0064* (2013.01); *B30B 15/062* (2013.01); *B32B 3/12* (2013.01); *B32B 3/26* (2013.01); *B32B 5/02* (2013.01); *B32B 5/08* (2013.01); *B32B 5/18* (2013.01); *B32B 5/245* (2013.01); *B32B 7/12* (2013.01); *B32B 27/065* (2013.01); *B32B 27/42* (2013.01); *B32B 37/0046* (2013.01); *B32B 37/0053* (2013.01); *B32B 37/10* (2013.01); *B32B 37/26* (2013.01);
(Continued)

(58) Field of Classification Search
CPC ............................. B30B 15/062; B30B 15/064
USPC .......................................................... 156/87
See application file for complete search history.

(56) References Cited

U.S. PATENT DOCUMENTS 2,268,477 A  * 12/1941  Elmendorf ............... B27D 1/04
                                                   156/312
2,664,833 A    1/1954  Armstrong et al.
(Continued)

FOREIGN PATENT DOCUMENTS

CH          498714       11/1970
CN        202115040        1/2012
(Continued)

OTHER PUBLICATIONS

3M, "200MP Micro-channel Laminating Adhesives. 467MC, 468MC, 467MCF and 468MCF", accessed at [http://kleylenta.ru/download/lenta/467mc.pdf] on Jun. 1, 2016, (3 pages).
(Continued)

*Primary Examiner* — Linda L Gray
(74) *Attorney, Agent, or Firm* — Hanley, Flight & Zimmerman, LLC

(57) ABSTRACT

Methods and apparatus to remove gas and vapor from a panel for a decorative layer are disclosed. An example apparatus includes a first press plate of a hot press to engage a first surface of a panel. The hot press is to apply heat to the panel via the first press plate to cure resin of the panel. A first portion of the first press plate is composed of a permeable material to remove at least one of gas or vapor from the panel to deter the at least one of gas or vapor from exerting a pressure on a decorative layer to be coupled to the panel to deter separation of a portion of the decorative layer from the panel.

20 Claims, 8 Drawing Sheets

(51) Int. Cl.

| | | |
|---|---|---|
| *B29C 37/00* | (2006.01) | |
| *B27N 7/00* | (2006.01) | |
| *B32B 3/00* | (2006.01) | |
| *B32B 27/00* | (2006.01) | |
| *B32B 5/00* | (2006.01) | |
| *B32B 38/00* | (2006.01) | |
| *B29D 24/00* | (2006.01) | |
| *B27N 3/00* | (2006.01) | |
| *B30B 15/06* | (2006.01) | |
| *B32B 37/10* | (2006.01) | |
| *B32B 37/26* | (2006.01) | |
| *B32B 3/12* | (2006.01) | |
| *B32B 3/26* | (2006.01) | |
| *B32B 5/02* | (2006.01) | |
| *B32B 27/42* | (2006.01) | |
| *B32B 5/18* | (2006.01) | |
| *B32B 5/24* | (2006.01) | |
| *B32B 7/12* | (2006.01) | |
| *B32B 27/06* | (2006.01) | |
| *B32B 5/08* | (2006.01) | |
| B32B 38/06 | (2006.01) | |
| B44C 1/10 | (2006.01) | |
| B32B 37/12 | (2006.01) | |
| B27N 3/08 | (2006.01) | |

(52) U.S. Cl.
CPC .......... *B27N 3/086* (2013.01); *B29D 24/005* (2013.01); *B32B 37/12* (2013.01); *B32B 38/06* (2013.01); *B32B 2038/0076* (2013.01); *B32B 2250/03* (2013.01); *B32B 2250/04* (2013.01); *B32B 2250/40* (2013.01); *B32B 2260/023* (2013.01); *B32B 2260/046* (2013.01); *B32B 2262/0269* (2013.01); *B32B 2262/062* (2013.01); *B32B 2262/065* (2013.01); *B32B 2262/067* (2013.01); *B32B 2262/101* (2013.01); *B32B 2262/106* (2013.01); *B32B 2262/14* (2013.01); *B32B 2305/022* (2013.01); *B32B 2305/024* (2013.01); *B32B 2305/076* (2013.01); *B32B 2305/08* (2013.01); *B32B 2307/50* (2013.01); *B32B 2307/546* (2013.01); *B32B 2307/724* (2013.01); *B32B 2307/7242* (2013.01); *B32B 2419/00* (2013.01); *B32B 2451/00* (2013.01); *B32B 2590/00* (2013.01); *B32B 2605/00* (2013.01); *B32B 2605/10* (2013.01); *B32B 2605/12* (2013.01); *B32B 2605/18* (2013.01); *B32B 2607/00* (2013.01); *B44C 1/105* (2013.01)

(56) References Cited

U.S. PATENT DOCUMENTS

| | | |
|---|---|---|
| 3,418,189 A | 12/1968 | Grosheim |
| 3,434,411 A | 3/1969 | Allen et al. |
| 4,219,376 A | 8/1980 | Roman |
| 4,238,437 A | 12/1980 | Rolston |
| 4,350,545 A | 9/1982 | Garabedian |
| 4,367,110 A | 1/1983 | Yoshikawa |
| 4,489,119 A | 12/1984 | Ishige et al. |
| 4,504,205 A | 3/1985 | Stofko |
| 4,598,007 A | 7/1986 | Kourtides et al. |
| 4,599,127 A | 7/1986 | Cannady, Jr. et al. |
| 4,693,926 A | 9/1987 | Kowalski et al. |
| 4,803,108 A | 2/1989 | Leuchten et al. |
| 4,855,182 A | 8/1989 | Ondrejas et al. |
| 5,037,350 A | 8/1991 | Richardson et al. |
| 5,085,921 A | 2/1992 | Jayarajan |
| 5,137,775 A | 8/1992 | Davis et al. |
| 5,589,016 A | 12/1996 | Hoopingarner et al. |
| 5,624,728 A | 4/1997 | Hoopingarner et al. |
| 5,698,153 A | 12/1997 | Hoopingarner et al. |
| 5,806,796 A | 9/1998 | Healey |
| 5,976,671 A | 11/1999 | Gleim |
| 6,066,385 A | 5/2000 | Kim |
| 6,251,497 B1 | 6/2001 | Hoopingarner et al. |
| 6,340,413 B1 | 1/2002 | Nilsson et al. |
| 6,419,776 B1 | 7/2002 | Hoopingarner et al. |
| 6,656,567 B1 | 12/2003 | Abe et al. |
| 6,726,971 B1 | 4/2004 | Wong |
| 7,063,119 B1 | 6/2006 | Kim |
| 8,097,108 B2 | 1/2012 | Wilde et al. |
| 8,555,946 B2 * | 10/2013 | Luo .................. B29C 65/18 156/515 |
| 8,715,824 B2 | 5/2014 | Rawlings et al. |
| 9,855,721 B2 | 1/2018 | Drexler et al. |
| 10,173,394 B2 | 1/2019 | Wang et al. |
| 2002/0084975 A1 | 7/2002 | Lin |
| 2002/0160680 A1 | 10/2002 | Laurence et al. |
| 2002/0182957 A1 | 12/2002 | Levenda |
| 2003/0033779 A1 | 2/2003 | Downey |
| 2003/0077423 A1 | 4/2003 | Flanigan et al. |
| 2003/0219578 A1 | 11/2003 | Jones et al. |
| 2003/0190458 A1 | 12/2003 | Spiewak et al. |
| 2004/0146696 A1 | 7/2004 | Jones |
| 2004/0192137 A1 | 9/2004 | Starkey et al. |
| 2004/0253414 A1 | 12/2004 | Longobardi |
| 2005/0050782 A1 | 3/2005 | Ryan et al. |
| 2005/0052516 A1 | 3/2005 | Wilde et al. |
| 2005/0088014 A1 | 4/2005 | Woodson et al. |
| 2005/0153023 A1 | 7/2005 | Overton |
| 2005/0255311 A1 | 11/2005 | Formella |
| 2006/0089073 A1 | 4/2006 | Sobieski |
| 2006/0151857 A1 | 7/2006 | Gasparoni |
| 2006/0234010 A1 | 10/2006 | Wirrick et al. |
| 2006/0246796 A1 | 11/2006 | Duffy |
| 2006/0277807 A1 | 12/2006 | Wilde et al. |
| 2007/0148410 A1 | 6/2007 | Wimer et al. |
| 2007/0218269 A1 | 9/2007 | Kato et al. |
| 2008/0087376 A1 | 4/2008 | Kitchin et al. |
| 2008/0145600 A1 | 6/2008 | Hendren et al. |
| 2008/0193695 A1 | 8/2008 | Kato et al. |
| 2008/0237909 A1 | 10/2008 | Bech |
| 2009/0057947 A1 | 3/2009 | Nemchick et al. |
| 2010/0139839 A1 | 6/2010 | Ridgard et al. |
| 2010/0215907 A1 | 8/2010 | Spires |
| 2011/0014419 A1 | 1/2011 | Simmons et al. |
| 2011/0042000 A1 | 2/2011 | Wilde et al. |
| 2012/0045638 A1 | 2/2012 | Waldman et al. |
| 2014/0120303 A1 | 5/2014 | Wilde et al. |
| 2014/0209231 A1 | 7/2014 | Schappert |
| 2016/0089851 A1 | 3/2016 | Drexler et al. |
| 2016/0250828 A1 | 9/2016 | Wilde et al. |
| 2017/0326836 A1 | 11/2017 | Wilde et al. |
| 2017/0326837 A1 | 11/2017 | Wang et al. |
| 2017/0326845 A1 | 11/2017 | Benham et al. |
| 2017/0326858 A1 | 11/2017 | Wang |
| 2017/0326863 A1 | 11/2017 | Wang et al. |

FOREIGN PATENT DOCUMENTS

| | | |
|---|---|---|
| DE | 19640263 | 4/1998 |
| DE | 102006054586 | 1/2008 |
| EP | 1013414 | 6/2000 |
| EP | 1600288 | 11/2005 |
| EP | 2085212 | 8/2009 |
| EP | 3000593 | 3/2016 |
| EP | 3061601 | 8/2016 |
| GB | 2174033 | 10/1986 |
| GB | 2228214 | 8/1990 |
| GB | 2491190 | 11/2012 |
| JP | 51024673 | 2/1976 |
| JP | 63042850 | 2/1988 |
| JP | 2088331 | 3/1990 |
| JP | 10030287 | 2/1998 |
| JP | 2000265589 | 9/2000 |
| JP | 2002138375 | 5/2002 |
| JP | 20040600061 | 2/2004 |
| JP | 2005075953 | 3/2005 |

(56) References Cited

FOREIGN PATENT DOCUMENTS

| JP | 2005219504 | 8/2005 |
|---|---|---|
| JP | 2008037060 | 2/2008 |
| JP | 2011021094 | 2/2011 |
| JP | 2011206998 | 10/2011 |
| KR | 20110026567 | 3/2011 |

OTHER PUBLICATIONS

United States Trademark and Patent Office, "Non-Final Office Action," issued in connection with U.S. Appl. No. 15/153,324, dated Jun. 14, 2018, 42 pages.
United States Trademark and Patent Office, "Non-Final Office Action," issued in connection with U.S. Appl. No. 15/153,297, dated Mar. 13, 2018, 16 pages.
United States Trademark and Patent Office, "Requirement for Election and/or Restriction," issued in connection with U.S. Appl. No. 15/153,324, dated Mar. 28, 2018, 5 pages.
European Patent Office, "Extended European Search Report," issued in connection with European Patent Application No. 17163795.2, dated Mar. 2, 2018, 14 pages.
Zhang et al., "Roll Manufacturing of Polymer Microfluidic Devices Using a Roll Embossing Process," Sensors and Actuators A, 230 (2015), pp. 156-169, 14 pages.
European Patent Office, "Extended European Search Report," issued in connection with European Patent Application No. 17163790.3, dated Oct. 17, 2017, 7 pages.
European Patent Office, "Extended European Search Report," issued in connection with European Patent Application No. 17163795.2, dated Oct. 18, 2017, 13 pages.
WEINIG, "WEINIG Unimat 500: The All-Round Machine for Greater Flexibility in Profiling," retrieved from <https://web.archive.org/web/20160207205725/https://www.weinig.com/en/solid-wood/planing-machines-and-moulders/unimat-series/unimat-500.html> on Sep. 29, 2017, 3 pages.
United States Patent and Trademark Office, "Final Office action," issued in connection with U.S. Appl. No. 15/153,324, dated Nov. 20, 2018, 31 pages.
United States Patent and Trademark Office, "Notice of Allowance," issued in connection with U.S. Appl. No. 15/153,297, dated Jul. 24, 2018, 27 pages.
United States Patent and Trademark Office, "Advisory Action," issued in connection with U.S. Appl. No. 15/153,324, dated Feb. 7, 2019, 5 pages.
United States Patent and Trademark Office, "Non-Final Office action," issued in connection with U.S. Appl. No. 15/153,324, dated Mar. 7, 2019, 21 pages.
European Patent Office, "Extended Search Report," issued in connection with European Patent Application No. 17163791.1, dated Oct. 12, 2017, 11 pages.
European Patent Office, "Extended Search Report," issued in connection with European Patent Application No. 17163792.9, dated Oct. 17, 2017, 10 pages.
European Patent Office, "Extended Search Report," issued in connection with European Patent Application No. 17163793.7, dated Oct. 16, 2017, 7 pages.
Definition "coil/coiling," Merriam-Webster dictionary, retrieved on Nov. 3, 2018 (Year:2018).

European Patent Office, "Extended European Search Report," issued in connection with European Patent Application No. 18202385.3, dated Jan. 24, 2019, 10 pages.
United States Patent and Trademark Office, "Final Office action," issued in connection with U.S. Appl. No. 15/153,252, dated Feb. 27, 2019, 15 pages.
United States Patent and Trademark Office, "Non-Final Office action," issued in connection with U.S. Appl. No. 15/153,252, dated May 31, 2018, 18 pages.
United States Patent and Trademark Office, "Non-final Office action," issued in connection with U.S. Appl. No. 15/153,266, dated Nov. 2, 2018, 20 pages.
United States Patent and Trademark Office, "Restriction Requirement," issued in connection with U.S. Appl. No. 15/153,266, dated Jun. 28, 2018, 7 pages.
United States Patent and Trademark Office, "Non-final Office action," issued in connection with U.S. Appl. No. 15/153,283, dated Nov. 9, 2018, 20 pages.
United States Patent and Trademark Office, "Restriction Requirement," issued in connection with U.S. Appl. No. 15/153,283, dated Jul. 12, 2018, 8 pages.
United States Patent and Trademark Office, "Final Office action," issued in connection with U.S. Appl. No. 15/153,283, dated Apr. 29, 2019, 21 pages.
United States Patent and Trademark Office, "Final Office action," issued in connection with U.S. Appl. No. 15/153,266, dated May 2, 2019, 46 pages.
United States Patent and Trademark Office, "Non-Final Office Action," issued in connection with U.S. Appl. No. 15/153,266, dated Aug. 1, 2019, 32 pages.
United States Patent and Trademark Office, "Notice of Allowance," issued in connection with U.S. Appl. No. 15/153,283, dated Aug. 19, 2019, 31 pages.
Hnited States Patent and Trademark Office,"Final Office Action," issued in connection with U.S. Appl. No. 15/153,324, dated Aug. 20, 2019, 27 pages.
European Patent Office, "Extended European Search Report," issued in connection with European Patent Application No. 19196880.9, dated Dec. 3, 2019, 7 pages.
United States Patent and Trademark Office, "Notice of Allowance," issued in connection with U.S. Appl. No. 15/153,324, dated Dec. 31, 2019, 10 pages.
United States Patent and Trademark Office, "Final Office Action," issued in connection with U.S. Appl. No. 15/153,252, dated Jan. 29, 2020, 46 pages.
European Patent Office, "Communication Pursuant to Article 94(3) EPC," issued in connection with application No. 17163791.1, dated Oct. 16, 2019, 4 pages.
United States Patent and Trademark Office, "Non-Final Office Action," issued in connection with U.S. Appl. No. 15/153,252, dated Sep. 13, 2019, 35 pages.
United States Patent and Trademark Office, "Advisory Action," issued in connection with U.S. Appl. No. 15/153,324, dated Nov. 5, 2019, 2 pages.
European Patent Office, "Communication pursant to Article 94(3) EPC," issued in connection with European Patent Application No. 18202385.3, dated Mar. 25, 2020, 6 pages.
United States Patent and Trademark Office, "Corrected Notice of Allowability," issued in connection with U.S. Appl. No. 15/153,266, dated Apr. 27, 2020, 16 pages.

\* cited by examiner

METHODS AND APPARATUS TO REMOVE GAS AND VAPOR FROM A PANEL FOR A DECORATIVE LAYER

CROSS-REFERENCE TO RELATED APPLICATIONS

This patent relates to subject matter disclosed in U.S. patent application Ser. No. 15/153,252 entitled "Methods and Apparatus to Couple a Decorative Layer to a Core Layer of a Panel via a Vapor Barrier Layer", U.S. patent application Ser. No. 15/153,266 (now U.S. Pat. No. 10,661,530) entitled "Methods and Apparatus to Couple a Decorative Layer to a Panel via a High-Bond Adhesive Layer", U.S. patent application Ser. No. 15/153,283 (now U.S Pat. No. 10,525,685) entitled "Methods and Apparatus to Couple a Decorative Composite Having a Reinforcing Layer to a Panel", U.S. patent application Ser. No. 15/153,297 (now U.S. Pat. No. 10,173,394) entitled "Methods and Apparatus to Vent Gas and Vapor from a Panel via Venting Channels for a Decorative Layer", U.S. patent application Ser. No. 15/153,324 (now U.S. Pat. No. 10,647,099) entitled "Methods and Apparatus to Form Venting Channels on a Panel for a Decorative Layer", all of which were filed on May 12, 2016 and are incorporated herein by reference in their entireties.

FIELD OF THE DISCLOSURE

This patent relates generally to decorative layers and, more particularly, to methods and apparatus to remove gas and vapor from a panel for a decorative layer.

BACKGROUND

Vehicles (e.g., aircraft, buses, trains, tractor-trailers, ships, etc.), buildings and/or other structures (e.g., billboards) include surfaces that are visible to the public. Oftentimes, these surfaces include decorative images for aesthetic, identification and/or advertising purposes. For example, some surfaces of aircraft include decorative images that identify an airline carrier associated with the aircraft. In some instances, the decorative images are formed on a decorative laminate that is coupled to the surface of the vehicle, building and/or other structure. A pocket of gas and/or vapor (e.g., water vapor) may form between the decorative laminate and the surface, thereby causing an adjacent portion of the decorative laminate to bubble.

SUMMARY

In one example, an apparatus includes a first press plate of a hot press to engage a first surface of a panel. The hot press is to apply heat to the panel via the first press plate to cure resin of the panel. A first portion of the first press plate is composed of a permeable material to remove at least one of gas or vapor from the panel to deter the at least one of gas or vapor from exerting a pressure on a decorative layer to be coupled to the panel to deter separation of a portion of the decorative layer from the panel.

In another example, an apparatus includes means for curing and means for engaging the means for curing. The means for engaging is to engage a surface of a panel. The means for curing is to apply heat to the panel via the means for engaging to cure resin of the panel. The apparatus includes means for removing at least one of gas or vapor of the means for engaging. The means for removing at least one of gas or vapor is to remove at least one of gas or vapor from the panel to deter the at least one of gas or vapor from exerting a pressure on a means for decorating to be coupled to the panel to deter separation of a portion of the means for decorating from the panel.

In another example, a method includes contacting a first press plate of a hot press to a first surface of a panel. A portion of the first press plate is composed of a permeable material that enables at least one of gas or vapor to traverse therethrough. The method includes applying heat to the panel, via the first press plate, to cure resin of the panel. The method includes removing the at least one of gas or vapor from the panel via the permeable material of the first press plate to deter the at least one of gas or vapor from exerting a pressure on a decorative layer to be coupled to the panel to deter separation of a portion of the decorative layer from the panel.

BRIEF DESCRIPTION OF THE DRAWINGS

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1:
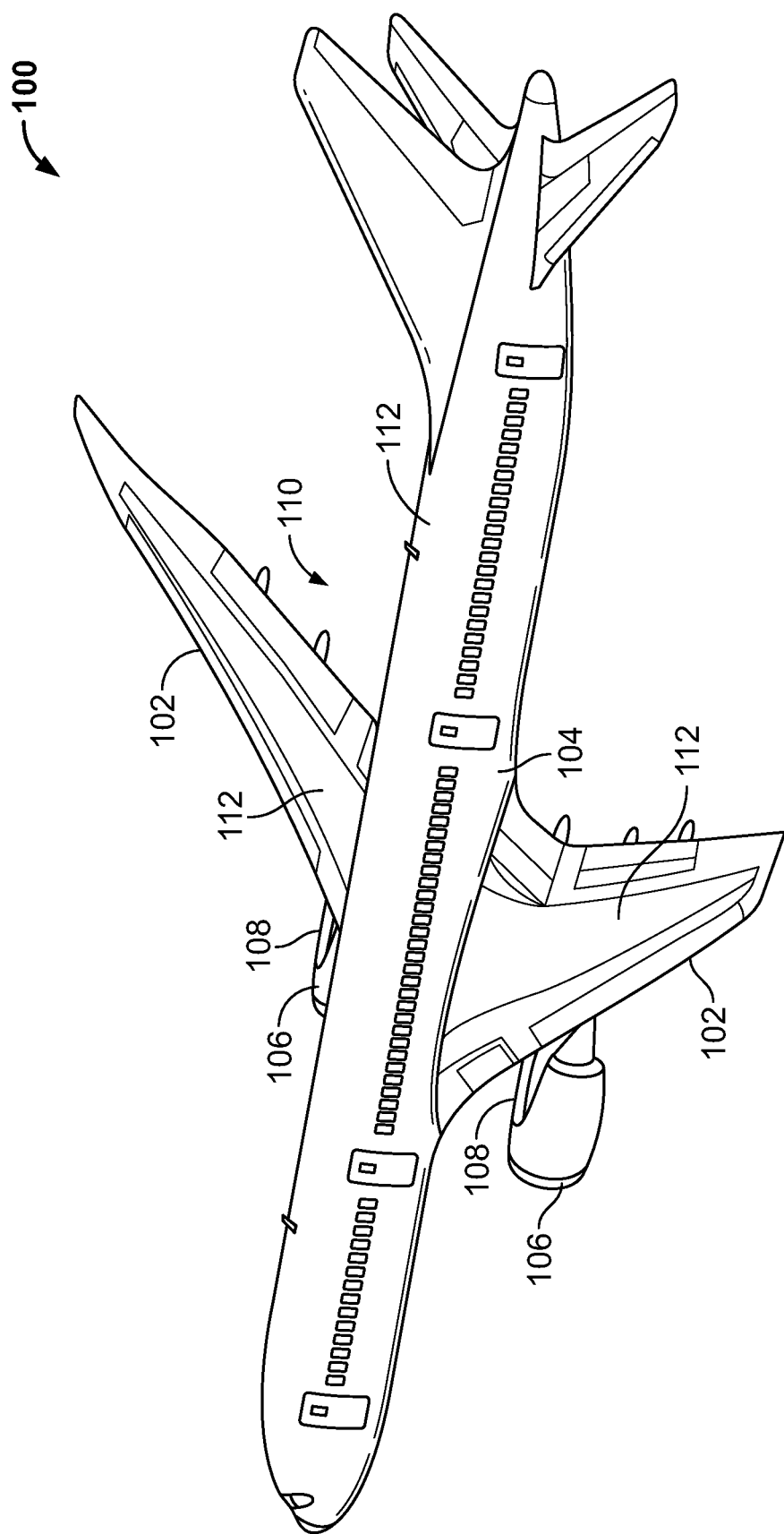
FIG. 1 depicts an example aircraft in accordance with the teachings herein.

Surfaces in public spaces (e.g., billboards, building walls, vehicle panels, etc.) oftentimes include decorative images for aesthetic, informational, and/or advertising purposes. For example, known aircraft and/or other vehicles (e.g., buses, trains, tractor-trailers, ships, etc.) often include decorative images on their surfaces for identification and/or advertising purposes. In some examples, the visible surfaces of aircraft interiors include decorative images that identify respective airline carriers associated with the aircraft.

Some known decorative images are formed on a decorative layer (e.g., a decorative laminate) that is coupled to a corresponding surface. For example, decorative layers are coupled to panels of aircraft via an adhesive layer. In some instances, a portion of the decorative layer or laminate may separate from the surface to which it is coupled. For example, a pocket of gas and/or vapor (e.g., water vapor) may form between the decorative laminate and the surface, thereby causing an adjacent portion of the decorative laminate to bubble. Such separation between the decorative laminate and the surface may be undesirable for aesthetic purposes (e.g., bubbling of the decorative laminate may be aesthetically unappealing) and/or may cause the decorative laminate to become damaged and/or to further separate (e.g., delaminate) from the surface over time.

In some instances, pockets of gas and/or vapor are entrapped between a decorative laminate and a surface of a panel (e.g., an interior surface in a compartment of the aircraft such as a surface of a bin, a lining, furnishings, etc.) when the decorative laminate is initially coupled to the surface. That is, the separation results from the decorative laminate not being laid flush with the surface when the decorative laminate is initially coupled to the surface.

In other instances, the pockets of gas and/or vapor that cause separation between the decorative laminate and the surface form as a result of the gas and/or vapor escaping from material of the panel and becoming trapped (e.g., to form a bubble) between the decorative laminate and the panel. When a decorative laminate is coupled to a panel of an aircraft, gas and/or vapor may be emitted from a core layer (e.g., a honeycomb core, a foam core, etc.) of the panel and subsequently become trapped between the decorative laminate and the surface of the panel. For example, the gas and/or vapor may escape and/or may be emitted from the core layer of the panel when there is a difference in pressure and/or temperature between the core layer of the panel and the environment exterior to the panel. For example, the gas and/or vapor may migrate from the core layer toward the decorative laminate when pressure closer to the core layer is greater than pressure closer to the decorative laminate. The gas and/or vapor becomes trapped between the decorative laminate as a result of the decorative laminate being composed of substantially impermeable and/or nonporous material that deters and/or impedes the gas and/or vapor of the core layer from traversing therethrough. The trapped gas and/or vapor creates an internal pressure between the decorative laminate and the panel that applies a concentrated force to the decorative laminate and/or the surface, thereby causing the decorative laminate to separate from the surface of the panel (e.g., from the interior surface in the aircraft compartment, etc.). Additionally or alternatively, the gas and/or vapor that is trapped between the decorative laminate and the panel may originate from an interaction (e.g., a chemical reaction, a physical reaction, etc.) between components of the panel and/or the decorative laminate such as between the core layer and a reinforcing layer of the panel, between the reinforcing layer and an adhesive coupled to the decorative laminate, etc.

To deter and/or impede gas and/or vapor from causing a portion of a decorative layer coupled to a panel from separating from the panel, the example methods and apparatus disclosed herein include removing gas and/or vapor (e.g., water vapor) from the panel as the panel is being formed prior to the decorative layer coupling to the panel. By removing the gas and/or vapor during formation of the panel, the example methods and apparatus deter and/or impede gas and/or vapor (e.g., water vapor) from being emitted from the panel (e.g., a core layer of the panel) when the decorative layer is coupled to the panel. As a result, the example methods and apparatus deter gas and/or vapor from becoming trapped between the decorative layer and a surface of the panel and, thus, deter and/or impede the gas and/or vapor from creating an internal pressure between the decorative layer and an outer resin layer of the panel that exerts a pressure and/or a force on a portion of the decorative layer. Accordingly, the example methods and apparatus removes the gas and/or vapor from the panel as the panel is being formed to deter and/or impede the decorative layer from separating from the panel (e.g., to deter and/or impede the decorative layer from bubbling).

In the examples disclosed herein, a hot press includes a first press plate that is to engage a first surface of a panel to enable the hot press to apply heat and/or pressure to the panel via the first press plate to form the panel (e.g., to cure resin of the panel that bonds layers of the panel together). A first portion of the first press plate is composed of permeable material that enables gas and/or vapor to traverse therethrough and deters and/or impedes uncured liquid resin of the resin layer from traversing therethrough. In some examples, the first press plate is formed by the first portion such that all and/or substantially all of the first press plate is composed of the permeable material of the first portion. The permeable material of the first portion enables gas and/or vapor (e.g., water vapor) to be removed from the panel to deter and/or impede the gas and/or vapor from exerting a pressure on a decorative layer that is to be coupled to the panel to deter and/or impede a portion of the decorative layer from separating from the panel (e.g., to deter and/or impede bubbling).

In some examples, the first portion of the first press plate is positioned on an outer surface of the first press plate to enable the permeable material of the first press plate to contact the panel when the first press plate engages the panel. As a result, the gas and/or vapor may be able to be removed from the panel via the first portion as the hot press forms the panel. The first press plate may include a second portion composed of low permeability material that impedes water vapor and liquid resin from traversing therethrough. In such examples, the first portion of the permeable material and the second portion of the low permeability material form the outer surface of the first press plate. In other examples, the second portion is composed of permeable material that allows water vapor and liquid resin to traverse therethrough. In such examples, the first portion composed of permeable material and the second portion composed of permeable material form the outer surface of the first press plate.

In some examples, the second portion of the first press plate defines one or more venting channels that extend along the outer surface of the first press plate, and the first portion of the first press plate is disposed in the venting channels defined by the second portion. The venting channels extend to an outer edge of the first press plate to enable the gas and/or vapor to move away from the panel to remove the gas and/or vapor from the panel. In some such examples, the first portion composed of the permeable material fills the venting channels so that the outer surface of the first press plate formed by the first portion and the second portion is flat. The permeable material of the first portion enables the gas and/or vapor to traverse through the first portion disposed in the venting channels to vent the gas and/or vapor away from the panel, and the outer surface of the first press plate is flat to deter and/or impede the venting channels of the first press plate from forming corresponding protrusions on the first surface of panel. In other such examples, the first portion composed of the permeable material partially fills the venting channels to enable the venting channels defined by the outer surface of the press plate to form corresponding protrusions on the first surface of the panel. The protrusions may subsequently be removed to deter and/or impede the first press plate from affecting an aesthetic characteristic of the decorative layer to be coupled to the panel.

In other examples, the first portion of the first press plate defines protrusions that extend along the outer surface defined by the second portion of the first press plate. The first portion of the first press plate is composed of the permeable material to enable the protrusions defined along the outer surface of the press plate to form corresponding channels on the first surface of the panel. The channels may further vent vapor and/or gas away from a decorative layer when the decorative layer is coupled to the panel.

Alternatively, the first portion of the first press plate includes a liquid-resistant layer (e.g., a first-liquid resistant layer) to engage the first surface of the panel and a permeable layer composed of the permeable material to engage the liquid-resistant layer that engages the panel. For example, the liquid-resistant layer is composed of biaxial stretch polytetrafluoroethylene (e.g., Gore-Tex®) and the permeable layer is composed of a porous material (e.g., porous metallic (e.g., aluminum) material, porous ceramic material, open-cell polymer foam, etc.). The permeable layer and the liquid-resistant layer enable the gas and/or vapor of the panel to traverse therethrough to enable the gas and/or vapor to be vented away from the panel. Further, while the liquid-resistant layer that engages the panel is gas-permeable (e.g., breathable) to enable the gas and/or vapor of the panel to traverse therethrough, the liquid-resistant layer impedes uncured liquid resin of the panel from traversing to the permeable material. For example, the liquid-resistant layer includes holes that are large enough to enable gas molecules to traverse therethrough and are small enough to deter and/or impede liquid molecules to traverse therethrough. Thus, the liquid-resistant material deters and/or impedes the liquid resin from reducing the porosity of the permeable material that would impede and/or prohibit the gas and/or vapor from being vented away from the panel through the permeable layer. In some such examples, the permeable layer, the first liquid-resistant layer, and the panel are separated upon forming the panel and/or removing the gas and/or vapor from the panel. To form a second panel and/or to remove gas and/or vapor from the second panel, the first liquid-resistant layer is replaced with a second liquid-resistant layer, the second liquid-resistant layer contacts the second panel, and the permeable layer contacts the second liquid-resistant layer that contacts the second panel. Subsequently, heat and/or pressure is applied to the second panel to form the second panel and to remove the gas and/or vapor from the second panel via the second liquid-resistant layer and the permeable layer.

Further, in some examples, the hot press includes a second press plate that is to engage a second surface of the panel opposite the first surface to further remove the gas and/or vapor from the panel that may otherwise cause a portion of the decorative layer to separate from the panel. In some examples, a vacuum is applied to the hot press to further remove the gas and/or vapor from the panel. Additionally or alternatively, a coating of moisture absorption material (e.g., moisture scavenging material such as silica gel) may be applied to the first press plate to capture and/or absorb gas and/or vapor emitted from the panel to further deter and/or impede the gas and/or vapor from exerting pressure on the decorative layer and, thus, to further deter and/or impede a portion of the decorative layer from separating from the panel.

As used herein, the terms "couple," "coupled," and "coupling" refer to a direct or indirect attachment of one object to another object (e.g., one layer to another layer). For example, a first object is directly attached and, thus, coupled to a second object if a surface of the first object contacts a surface of the second object without any other object disposed therebetween. A first object is indirectly attached and, thus, coupled to a second object if the first object does not directly contact the second object but, instead, is fixed to the second object via intermediate object(s) (e.g., layer(s)) that are positioned between the first and second objects.

Turning to the figures, FIG. 1 illustrates an example aircraft 100 including wings 102 (e.g., a right wing and a left wing) extending laterally outward from a fuselage 104. Each of the wings 102 of the illustrated example supports an aircraft engine 106 via a pylon 108. A compartment 110 (e.g., a cargo compartment, a passenger compartment, a flight deck, etc.) is disposed within the fuselage 104 of the illustrated example. The wings 102 and the fuselage 104 define an outer surface 112 of the aircraft 100.

Figure 2A:
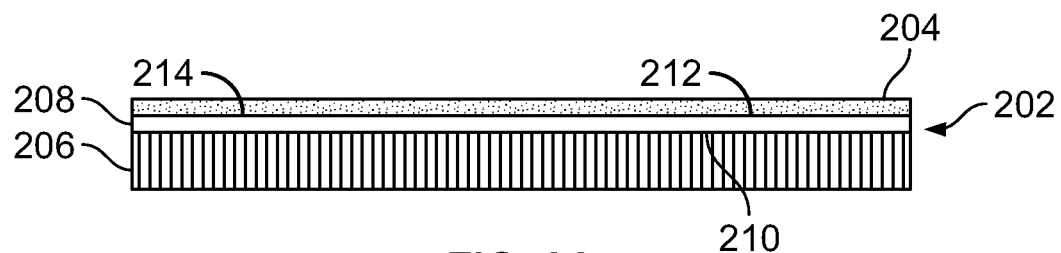
FIG. 2A is a cross-sectional view of a known decorative layer and a portion of a known panel.
Figure 2B:
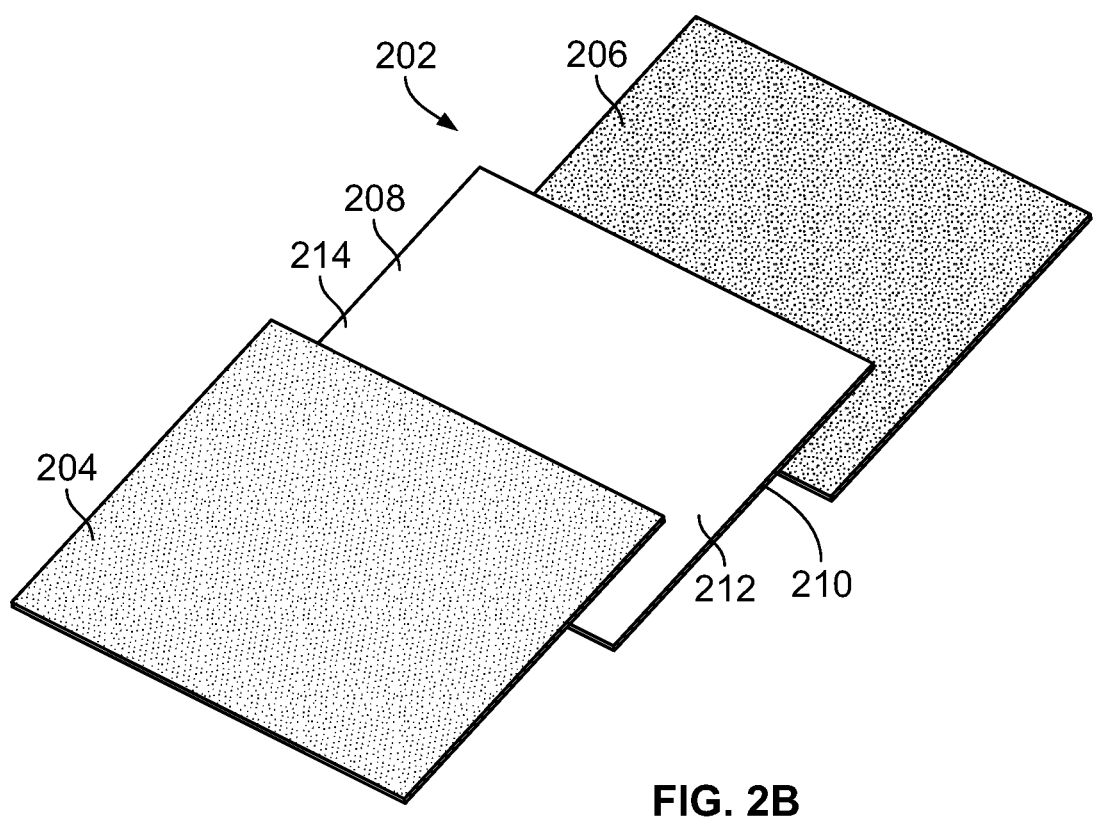
FIG. 2B is an exploded view of the known decorative layer and the portion of the known panel of FIG. 2A.

Before discussing the example decorative layers and the example panels disclosed herein, a brief description of a known panel 202 and a known decorative layer 204 is provided in connection with FIGS. 2A and 2B. More specifically, FIG. 2A is a cross-sectional view of the known decorative layer 204 and a portion of the known panel 202, and FIG. 2B is an exploded view of the known decorative layer 204 and the portion of the known panel 202.

As illustrated in FIGS. 2A and 2B, the known panel 202 includes a core layer 206 and a reinforcing layer 208 coupled to the core layer 206. A first surface 210 of the reinforcing layer 208 engages the core layer 206, and an opposing second surface 212 defines a surface 214 of the panel 202. The reinforcing layer 208 of the known panel 202 may be composed of materials that are partially porous and/or permeable (e.g., resin, reinforcing fiber, etc.) such that some vapor (e.g., water vapor) may traverse through the reinforcing layer 208. Further, while not shown in the portion of the known panel 202 illustrated in FIGS. 2A and 2B, another reinforcing layer engages another surface of the core layer 206 opposite the reinforcing layer 208 such that a sandwich-structured composite is formed by the reinforcing layer 208, the core layer 206, and the other opposing reinforcing layer.

Further, the known decorative layer 204 includes decorative features (e.g., colors, patterns, logos, text, etc.) that are to be displayed on the known panel 202. As illustrated in FIG. 2A, the decorative layer 204 is coupled to the surface 214 of the panel 202 to enable the decorative features of the decorative layer 204 to be displayed on the panel 202. For example, the decorative layer 204 is adhesively coupled to the second surface 212 of the reinforcing layer 208.

In some instances, gas and/or vapor (e.g., water vapor) is trapped within the core layer 206 of the panel 202 (e.g., trapped between the reinforcing layer 208 and the opposing reinforcing layer of a sandwich-structured composite of the panel 202). When a difference in pressure and/or temperature between the core layer 206 and the environment exterior to the panel 202 occurs (e.g., when pressure closer to the core layer 206 is greater than pressure closer to the decorative layer 204), the gas and/or vapor escape and/or are emitted from the core layer 206 of the panel 202. In other instances, gas and/or vapor of the panel 202 may originate from an interaction (e.g., a chemical reaction, a physical reaction, etc.) between material of the core layer 206 (e.g., a honeycomb core, a foam core, resin, reinforcing fiber fiberglass, graphite-cloth, etc.) and/or the decorative layer 204 (e.g., a decorative laminate, an adhesive layer, etc.).

Because the decorative layer 204 coupled to the panel 202 is composed of substantially impermeable and/or nonporous material, the vapor and/or gas that is emitted from the core layer 206 traverses through the reinforcing layer 208 and becomes trapped between the decorative layer 204 and the surface 214 of the panel 202. The trapped vapor and/or gas create an internal pressure that applies a concentrated force to an adjacent portion of the decorative layer 204 and/or the surface 214 of the panel 202. For example, the applied force pushes a portion of the decorative layer 204 away from the surface 214 of the panel 202, thereby causing the portion of the decorative layer 204 to separate from the panel 202. In other words, vapor and/or gas of the known panel 202 may form bubbles in the known decorative layer 204 that are aesthetically unappealing and/or which damage the decorative layer 204.

Figure 3:
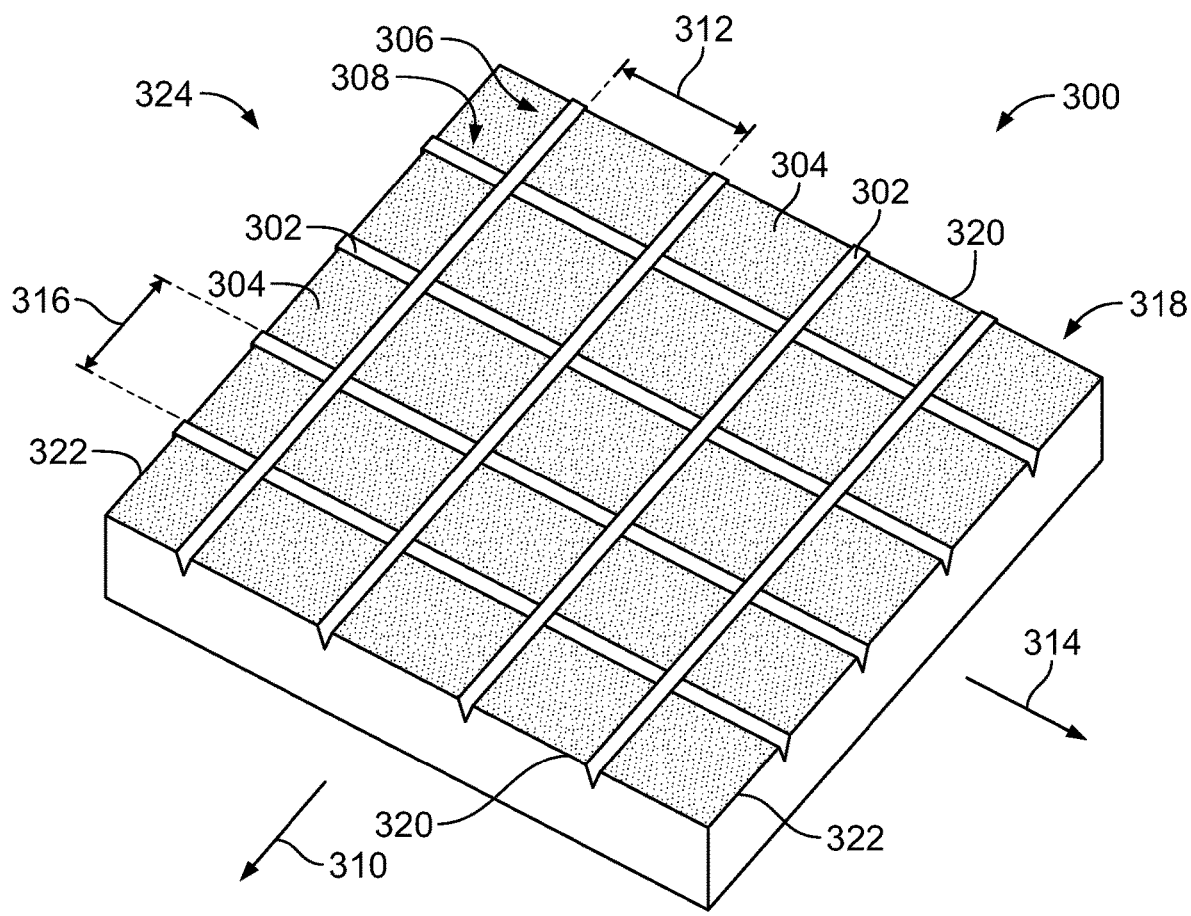
FIG. 3 illustrates an example press plate in accordance with the teachings disclosed herein.

FIG. 3 illustrates an example press plate 300 in accordance with the teachings disclosed herein. As described in further detail below, the press plate 300 is to engage a panel (e.g., a panel 404 of FIGS. 4-7) to apply heat and/or pressure to form the panel. Further, as illustrated in FIG. 3, the press plate 300 includes a first portion 302 and a second portion 304 that defines one or more venting channels 306 (e.g., first venting channels) and one or more venting channels 308 (e.g., second venting channels) in which the first portion 302 is disposed. The venting channels 306, 308 and the first portion 302 enable the press plate 300 to remove gas and/or vapor from the panel to deter the gas and/or vapor from accumulating and/or becoming trapped within cells of a honeycomb core of the panel as the panel is being formed to deter and/or impede the gas and/or vapor from separating a portion of a decorative layer (e.g., a decorative layer 602 of FIGS. 6 and 7) that is coupled to the panel. In some examples, the first portion 302 and/or the second portion 304 of the press plate 300 are formed via additive manufacturing (e.g., 3D printing).

For example, the second portion 304 of the press plate 300 is composed of a low permeability material (e.g., a substantially non-porous metal such as steel) that deters and/or impedes water vapor and liquid resin from traversing through the second portion 304. In some examples, the low permeability material of the second portion 304 deters and/or impedes water vapor originating from the panel (e.g., the panel 404 of FIGS. 4-7) and liquid resin of the panel (e.g., uncured liquid resin of the panel 404) from traversing through the second portion 304 when the press plate 300 engages the panel. Alternatively, the second portion 304 of the press plate 300 may be composed of permeable and/or porous material (e.g., porous metallic material (e.g., porous aluminum, porous ceramic material, open-cell polymer foam, etc.) that allows water vapor and/or liquid resin to traverse therethrough. As illustrated in FIG. 3, each of the venting channels 306 defined by the second portion 304 extends in a direction 310 (e.g., a first direction) and, thus, is approximately parallel to each of the other venting channels 306. For example, the venting channels 306 are spaced apart equidistantly by a distance 312 of about between 0.125 inches (3.175 millimeters) and 2 inches (50.8 millimeters). In other examples, the venting channels 306 may be spaced apart non-equidistantly from each other. Further, each of the venting channels 308 defined by the second portion 304 extends in a direction 314 (e.g., a second direction) and, thus, is approximately parallel to each of the other venting channels 308. For example, the venting channels 308 are spaced apart equidistantly by a distance 316 of about between 0.125 inches (3.175 millimeters) and 2 inches (50.8 millimeters). The distance 312 between the venting channels 306 and/or the distance 316 between the venting channels 308 increases a surface area of the venting channels 306, 308 of the grid 324 to increase an amount of gas and/or vapor vented through the venting channels 306, 308 without comprising the structure of the outer surface 318 of the press plate 300.

The first portion 302 of the press plate 300 is composed of permeable and/or porous material (e.g., porous metallic material (e.g., porous aluminum, porous ceramic material, open-cell polymer foam, etc.). In the illustrated example, the first portion 302 is disposed in the venting channels 306, 308 defined by the second portion 304. The first portion 302 and the second portion 304 define an outer surface 318 of the press plate 300 that is to engage the panel (e.g., the panel 404 of FIGS. 4-7) to form a hot press (e.g., a hot press 400 of FIGS. 4 and 5) to form the panel. In some examples, the first portion 302 fills the venting channels 306, 308 so that the outer surface 318 formed by the first portion 302 and the second portion 304 is approximately flat. In other examples, the first portion 302 partially fills the venting channels 306, 308 such that a portion of the venting channels 306, 308 remains unfilled by the permeable material of the first portion 302.

The venting channels 306, 308 and the permeable material of the first portion 302 disposed in the venting channels 306, 308 enable gas and/or vapor (e.g., water vapor originating from the panel 404 of FIGS. 4-7) to traverse through the venting channels 306, 308. For example, the venting channels 306 extend to outer edges 320 of the press plate 300 and the venting channels 308 extend to outer edges 322 of the press plate 300 to enable the venting channels 306, 308 and the first portion 302 disposed in the venting channels 306, 308 to vent the gas and/or vapor originating from the panel away from the decorative layer (e.g., the decorative layer 602 of FIGS. 6 and 7). The permeable material of the first portion 302 may deter and/or impede liquid resin (e.g., liquid resin of the panel 404) from traversing through the first portion 302 to deter and/or impede the liquid resin from reducing the porosity of the first portion 302. In such examples, the permeable material of the first portion 302 deters and/or impedes the liquid resin from impeding and/or prohibiting the gas and/or vapor from venting away from the panel through the venting channels 306, 308. Further, in the illustrated example, the venting channels 306 intersect the venting channels 308 to form a grid 324. For example, the venting channels 306, 308 of the grid 324 intersect to increase an amount of gas and/or vapor that the venting channels 306, 308 are able to vent away from the panel by enabling the gas and/or vapor to traverse through one of the venting channels 306, 308 if another of the venting channels 306, 308 is partially or fully obstructed. In the illustrated example, the intersecting venting channels 306, 308 are approximately perpendicular to each other. In other examples, the venting channels 306, 308 are substantially non-perpendicular relative to each other (e.g., intersect at an angle of about 30 degrees, 45 degrees, 60 degrees) and/or do not intersect. For example, the venting channels 306, 308 may intersect at a substantially non-perpendicular angle to direct the gas and/or vapor toward and/or away from a portion of the outer edges 320, 322 of the press plate 300.

Alternatively, the press plate 300 includes the first portion 302 that includes protrusions extending along the outer surface 318 defined by the second portion 304. The protrusions of the first portion 302 extend to the outer edges 320, 322 of the press plate 300 to enable protrusions of the first portion 302 to vent the gas and/or vapor originating from the panel away from the decorative layer (e.g., the decorative layer 602 of FIGS. 6 and 7). Further, in other examples, the press plate 300 does not include the second portion 304. In such examples, the first portion 302 forms the press plate 300 such that the venting channels 306, 308 and/or protrusions, the outer surface 318 and/or all other portions of the press plate 300 are composed of the permeable material of the first portion 302.

Figure 4:
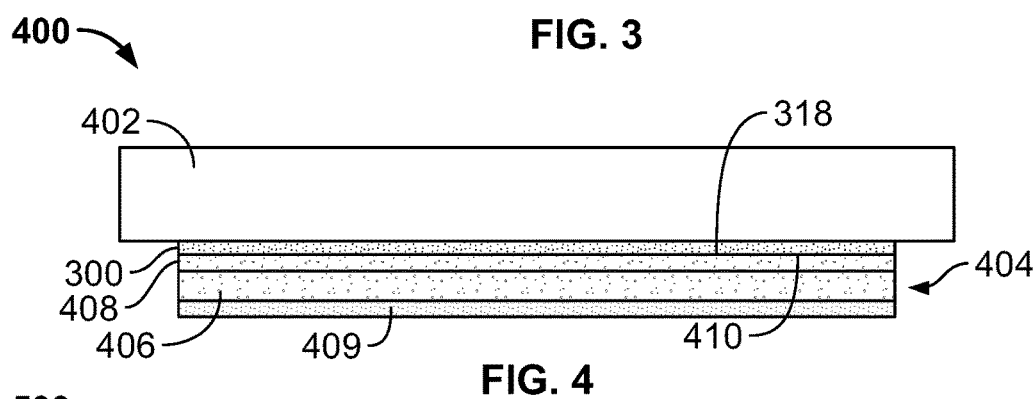
FIG. 4 illustrates an example hot press having the press plate of FIG. 3 in accordance with the teachings herein.

FIG. 4 illustrates an example hot press 400 having the press plate 300 and an example base plate 402 in accordance with the teachings herein. The hot press 400 applies heat and/or pressure to an example panel 404 to form the panel 404. In the illustrated example, the venting channels 306, 308 and the first portion 302 (FIG. 3) of the press plate 300 remove gas and/or vapor from the panel 404 as the hot press 400 forms the panel 404 to deter and/or impede a portion of the decorative layer (e.g., the decorative layer 602 of FIGS. 6 and 7) that is coupled to the panel 404 from separating from the panel 404. In some examples, the press plate 300 and/or the base plate 402 of the hot press 400 are formed via additive manufacturing (e.g., 3D printing).

In the illustrated example, the panel 404 includes a core layer 406, a reinforcing layer 408, and another reinforcing layer 409 opposite the reinforcing layer 408 (e.g., to form a sandwich-structured composite). For example, the opposing reinforcing layers 408, 409 trap gas and/or vapor in the core layer 406 of the panel 404. The core layer 406 is composed of, for example, a honeycomb core, a foam core and/or a combination thereof. In some such examples, the core layer 406 includes a honeycomb core and foam material that fills openings of the honeycomb core. The material(s) of the core layer 406 are lightweight and the structure of the core layer 406 (e.g., the honeycomb pattern) provides flexural strength (e.g., bending stiffness) to the panel 404. Thus, the core layer 406 provides flexural strength to the panel 404 without adding a significant amount of weight to the panel 404 and, thus, to the structure of which the panel 404 forms a surface (e.g., the outer surface 112 of the aircraft 100 of FIG. 1 and/or a surface of bin (e.g., a stow-bin), a lining (e.g., of a sidewall, a ceiling, etc.), furnishings (e.g., a monument, a closet, a crew-rest, a lavatory, etc.) located in the compartment 110 of the aircraft 100 of FIG. 1, etc.).

Each of the reinforcing layers 408, 409 of the example panel 404 includes a fiber reinforcing layer composed of, for example, of fiberglass, graphite-cloth, synthetic fiber (e.g., Aramid fiber), natural fiber, (e.g., wood, flax, cellulose, jute, hemp, straw, switch grass, kenaf, cotton, coir, bamboo, etc.), a combination thereof and/or any other material that reinforces the core layer 406 (e.g., by providing compression strength to the panel 404). Further, each of the reinforcing layers 408, 409 includes resin (e.g., an outer resin layer) that is composed of, for example, phenolic resin. In some examples, the reinforcing layer 408 and/or the reinforcing layer 409 is a pre-impregnated layer (i.e., prepreg) in which the fiber reinforcing layer is pre-impregnated with resin (e.g., resin of the resin layer). The pre-impregnated resin is partially cured upon formation of the reinforcing layer 408 and/or the reinforcing layer 409.

To form the panel 404, the hot press 400 cures the resin of the reinforcing layers 408, 409 to bond and/or couple the core layer 406 and the adjacent fiber reinforcing layer of the respective reinforcing layers 408, 409. To cure the resin of the panel 404, the press plate 300 of the example hot press 400 engages a surface 410 (e.g., a first surface) of the panel 404. For example, the outer surface 318 of the press plate 300 engages the surface 410 of the panel 404, and the base plate 402 of the hot press 400 engages the press plate 300 that engages the panel 404. The base plate 402 applies heat and/or pressure (e.g., about between 25 psi (172.4 to kPa) and 30 psi (206.8 to kPa)) to the panel 404 via the press plate 300 to cure the resin of the panel 404 and, thus, to form the panel 404. For example, another plate (e.g., a hydraulic plate) engages the reinforcing layer 409 to enable the base plate 402 to apply the pressure to the opposing reinforcing layer 408. In some examples, a vacuum is applied to the hot press 400 and/or the panel 404 to further cure and/or to expedite curing of the resin of the panel 404.

In some examples, gas and/or vapor (e.g., water vapor) initially is trapped within the core layer 406 of the panel 404 (e.g., between the opposing reinforcing layers 408, 409). The trapped water vapor escapes and/or is emitted from the core layer 406 when there is a difference in pressure (e.g., when pressure closer to the core layer 406 is greater than pressure closer to the decorative layer) and/or temperature between the core layer 406 and the environment exterior to the panel 404. Additionally or alternatively, water vapor is emitted from the panel 404 as a result of an interaction (e.g., a chemical reaction, a physical reaction, etc.) between different materials of the panel 404. Further, in some examples, the reinforcing layer 408 is partially permeable and/or porous and, thus, enables water vapor emitted from the core layer 406 to traverse therethrough and reach a decorative layer (e.g., the decorative layer 602 of FIGS. 6 and 7) when the decorative layer is coupled to the surface 410 of the panel 404.

To deter and/or impede the gas and/or vapor from a causing a portion of the decorative layer to separate from the panel 404, the venting channels 306, 308 and the first portion 302 of the press plate 300 remove the gas and/or vapor from the panel 404 by venting the gas and/or vapor away from the panel 404 while the hot press 400 is forming the panel 404. For example, as the hot press 400 applies heat and/or pressure to the panel 404 via the press plate 300, gas and/or vapor (e.g., water vapor) is emitted from the panel 404 and enters the venting channels 306, 308 defined on the outer surface 318 of the press plate 300 that engages the surface 410 of the panel 404. The gas and/or vapor traverses through the venting channels 306, 308 and/or the first portion 302 of the press plate 300 disposed in the venting channels 306, 308. Because the venting channels 306, 308 extend to the edges 320, 322 (FIG. 3) of the press plate 300, the venting channels 306, 308 vent the gas and/or vapor away from the panel 404 as the panel is being formed. In some examples, a vacuum is applied to the hot press 400 and/or the panel 404 to further enable and/or to expedite removal of the gas and/or vapor from the panel 404 via the press plate 300. By removing the gas and/or vapor from the panel 404 before the decorative layer is coupled to the surface 410 of the panel 404, the press plate 300 of the example hot press 400 deters and/or impedes a portion of the decorative layer from separating from the panel 404 (e.g., the press plate 300 removes the gas and/or vapor to deter and/or impede subsequent bubbling of the decorative layer 602).

Figure 5:
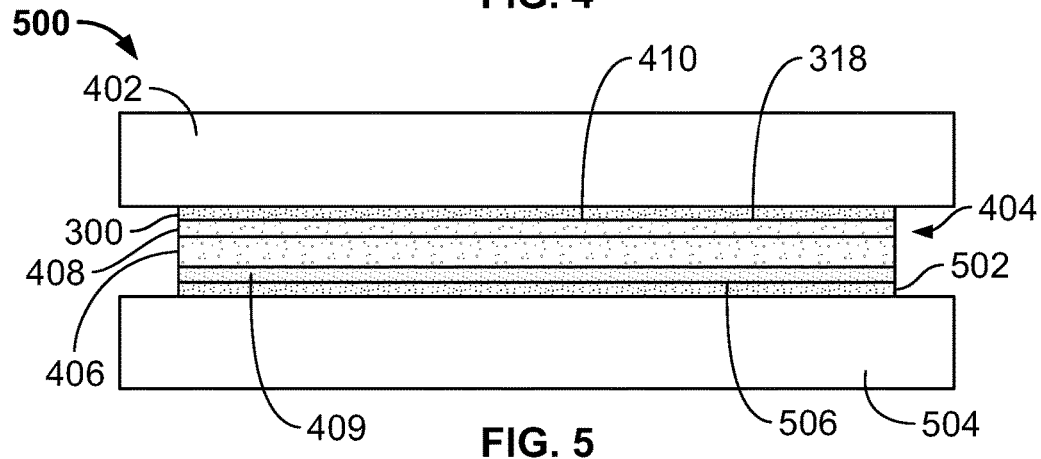
FIG. 5 illustrates another example hot press having the press plate of FIG. 3 and another example press plate in accordance with the teachings herein.

FIG. 5 illustrates another example hot press 500 having the press plate 300 and another example press plate 502 that removes gas and/or vapor from the panel 404 in accordance with the teachings herein.

The press plate 300, the base plate 402, and the panel 404 (e.g., the core layer 406 and the reinforcing layers 408, 409) of FIG. 5 are substantially similar or identical to those components having the same reference numbers in FIGS. 3 and 4. Those components are described above in detail in connection with FIGS. 3 and 4 and will not be described in further detail below. Further, the press plate 502 and a base plate 504 of FIG. 5 are substantially similar or identical to example press plate 300 of FIGS. 3 and 4 and the base plate 402 of FIG. 4, respectively. Because the press plate 300 and the base plate 402 are described in detail in connection with FIGS. 3 and 4, some characteristics of the press plate 502 and the base plate 504 of FIG. 5 are not described in further detail below.

In the illustrated example, the hot press 500 includes the press plate 300 (e.g., a first press plate), the base plate 402 (e.g., a first base plate), the press plate 502 (e.g., a second press plate), and the base plate 504 (e.g., a second base plate). The outer surface 318 of the press plate 300 and the base plate 402 apply heat and/or pressure to the surface 410 (e.g., the first surface) of the panel 404 to form the panel 404 and/or to remove gas and/or vapor (e.g., water vapor) from the panel 404. As illustrated in FIG. 5, the press plate 502 engages another surface 506 (e.g., a second surface) of the panel 404 (e.g., a second surface opposite the first surface of the panel 404), and the base plate 504 engages the press plate 502. The base plate 504 applies heat and/or pressure to the surface 506 of the panel 404 via the press plate 502 to further and/or expedite formation of the panel 404 and/or removal of the gas and/or vapor from the panel 404. Thus, by removing the gas and/or vapor from the panel 404, the base plate 504 and the press plate 502 of the hot press 500 further deter and/or impede a portion of a decorative layer (e.g., the decorative layer 602 of FIGS. 6 and 7) from separating from the panel 404 (e.g., the press plate 502 removes the gas and/or vapor to deter and/or impede subsequent bubbling of the decorative layer).

Figure 6:
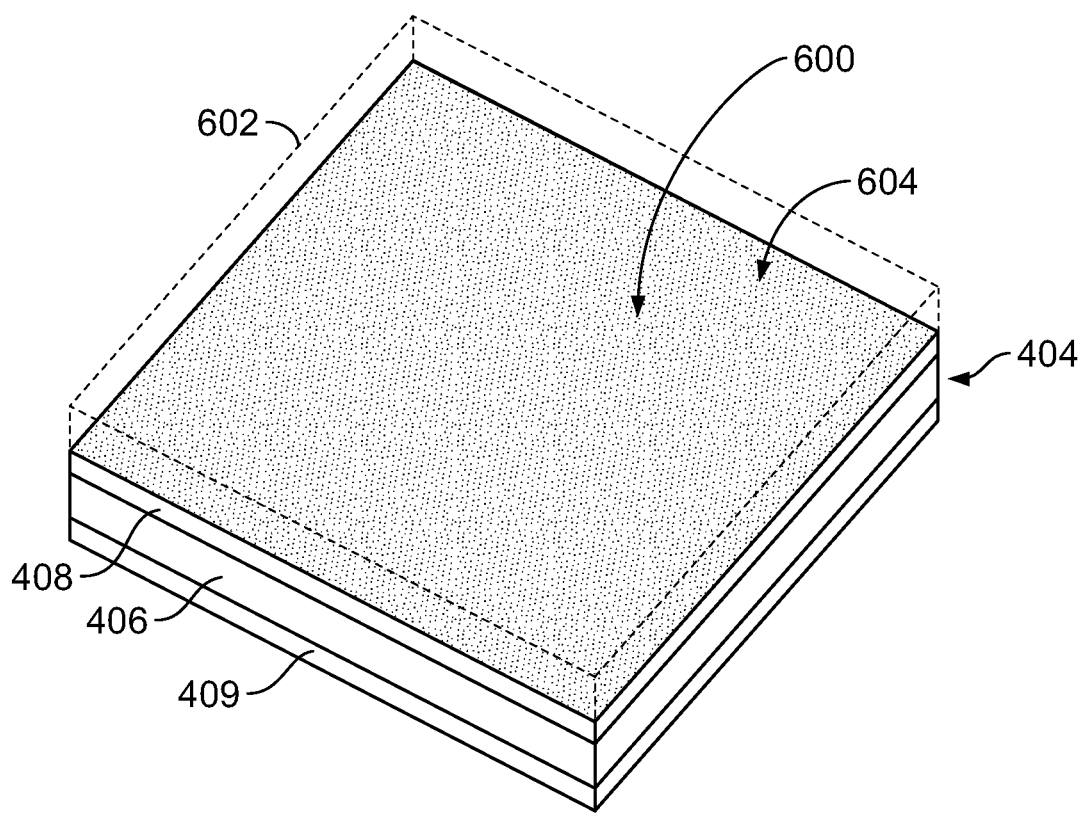
FIG. 6 illustrates an example surface of a panel formed by the press plate of FIG. 3.

FIG. 6 illustrates an example surface 600 of the panel 404 formed by the hot press 400 (FIG. 4) and/or the hot press 500 (FIG. 5). In the illustrated example, a decorative layer 602 is coupled to the surface 600 of the panel 404. The panel 404 (e.g., the example core layer 406 and the example reinforcing layers 408, 409) of FIG. 6 is substantially similar or identical to that component having the same reference number in FIG. 4.

The surface 600 of the panel 404 of the illustrated example is formed by the outer surface 318 of the press plate 300 (FIG. 3). For example, the surface 600 is formed by the press plate 300 when the press plate 300 engages the panel 404 to enable the hot press 400 and/or the hot press 500 to apply heat and/or pressure to the panel 404. Because the outer surface 318 of the press plate 300 contacts the surface 600 of the panel 404 to cure resin (e.g., an outer resin layer) of the panel 404, the surface 600 of the panel 404 has a pattern that is substantially a reciprocal of a pattern of the outer surface 318 of the press plate 300. For example, the flat surface 600 of FIG. 6 is formed by the flat outer surface 318 of the press plate 300. In some examples, the surface 600 of the panel 404 is flat to deter and/or impede the surface 600 from affecting an aesthetic characteristic of the decorative layer 602 coupled to the panel 404. Additionally or alternatively, the surface 600 of the panel 404 is flat to deter and/or impede gas and/or vapor from becoming trapped between the panel 404 and the decorative layer 602, thereby further deterring and/or impeding a portion of the decorative layer 602 from separating from the panel 404. In some examples, a coating 604 of moisture absorption material (e.g., moisture scavenging material such as silica gel) is applied to the outer surface 318 of press plate 300 (e.g., in the venting channels 306, 308) to capture and/or absorb the gas and/or vapor that is emitted from the panel 404 to further deter and/or impede a portion of the decorative layer 602 from separating from the panel 404.

Figure 7:
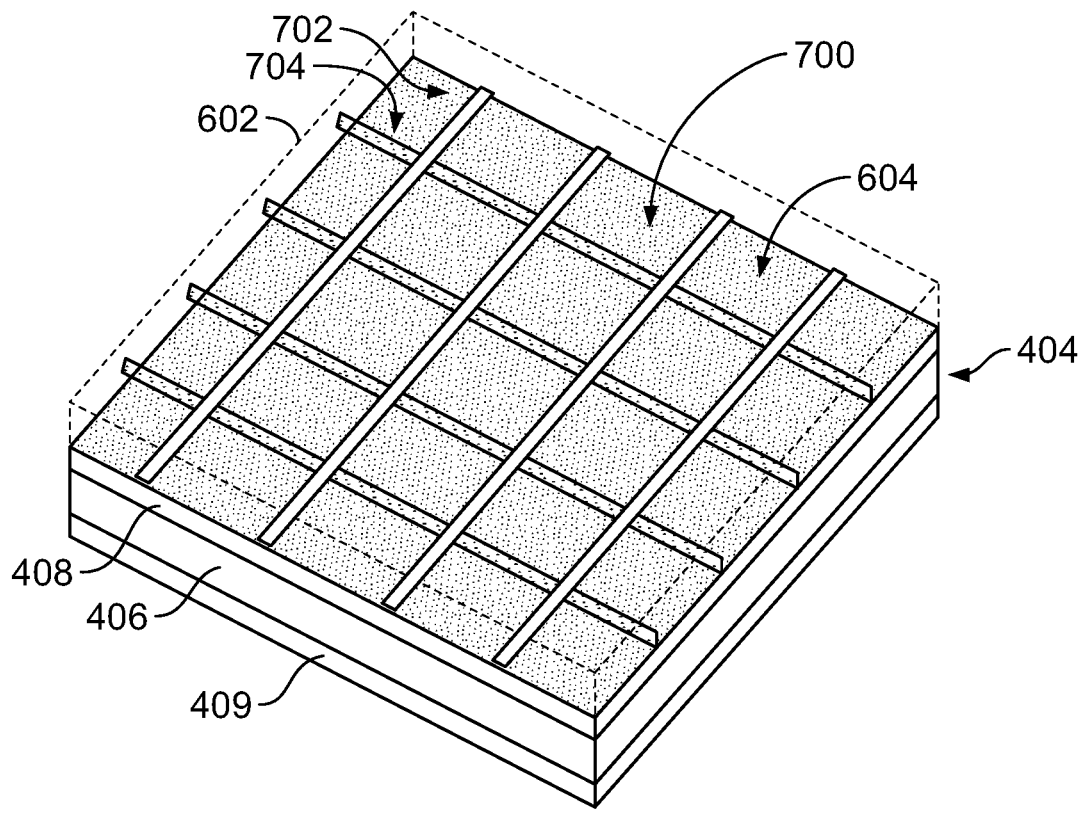
FIG. 7 illustrates another example surface of a panel formed by the press plate of FIG. 3.

FIG. 7 illustrates another example surface 700 of the panel 404 formed by the hot press 400 (FIG. 4) and/or the hot press 500 (FIG. 5). In the illustrated example, the decorative layer 602 is coupled to the surface 700 of the panel 404.

The panel 404 (e.g., the core layer 406 and the reinforcing layers 408, 409) of FIG. 7 is substantially similar or identical to that component having the same reference number in FIG. 4, and the decorative layer 602 and the coating 604 of FIG. 7 are substantially similar or identical to those components having the same reference numbers of FIG. 6.

The surface 700 of the panel 404 of the illustrated example is formed by the outer surface 318 of the press plate 300 (FIG. 3). For example, the outer surface 318 of the press plate 300 engages the surface 700 of the panel 404 as resin (e.g., an outer resin layer) of the reinforcing layers 408, 409 of the panel 404 is cured. As a result, the surface 700 of the panel 404 has a pattern that is substantially a reciprocal of a pattern of the outer surface 318 of the press plate 300. In some examples, the venting channels 306, 308 (FIG. 3) that extend on the outer surface 318 of the press plate 300 are partially filled by the first portion 302 (FIG. 3) of the press plate 300 such that portions of the venting channels 306, 308 remain unfilled by the first portion 302. As illustrated in FIG. 7, the venting channels 306, 308 of the press plate 300 form corresponding protrusions 702, 704 on the surface 700 of the panel 404. The protrusions 702, 704 may affect an aesthetic characteristic of the decorative layer 602 coupled to the panel 404. In some examples, to deter and/or impede the aesthetic characteristic from being affected and/or to deter and/or impede gas and/or vapor from becoming trapped between the panel 404 and the decorative layer 602, the protrusions 702, 704 are removed from the surface 700 of the panel 404 by a secondary manufacturing process (e.g., sanding) so that the surface 700 is substantially flat.

In other examples in which the first portion 302 defines protrusions that extend along the outer surface 318 of the press plate 300, the protrusions form channels on the surface 700 of the panel 404. The channels may enable gas and/or vapor to be vented away from the decorative layer 602 when the decorative layer 602 is coupled to the panel 404 to further deter and/or impede the gas and/or vapor from becoming trapped between the surface 700 of the panel 404 and the decorative layer 602. Further, the channels may affect an aesthetic characteristic of the decorative layer 602 coupled to the panel 404. In such examples, the channels may be removed from the surface 700 of the panel 404 by a secondary manufacturing process (e.g., sanding) so that the surface 700 is substantially flat.

Figure 8:
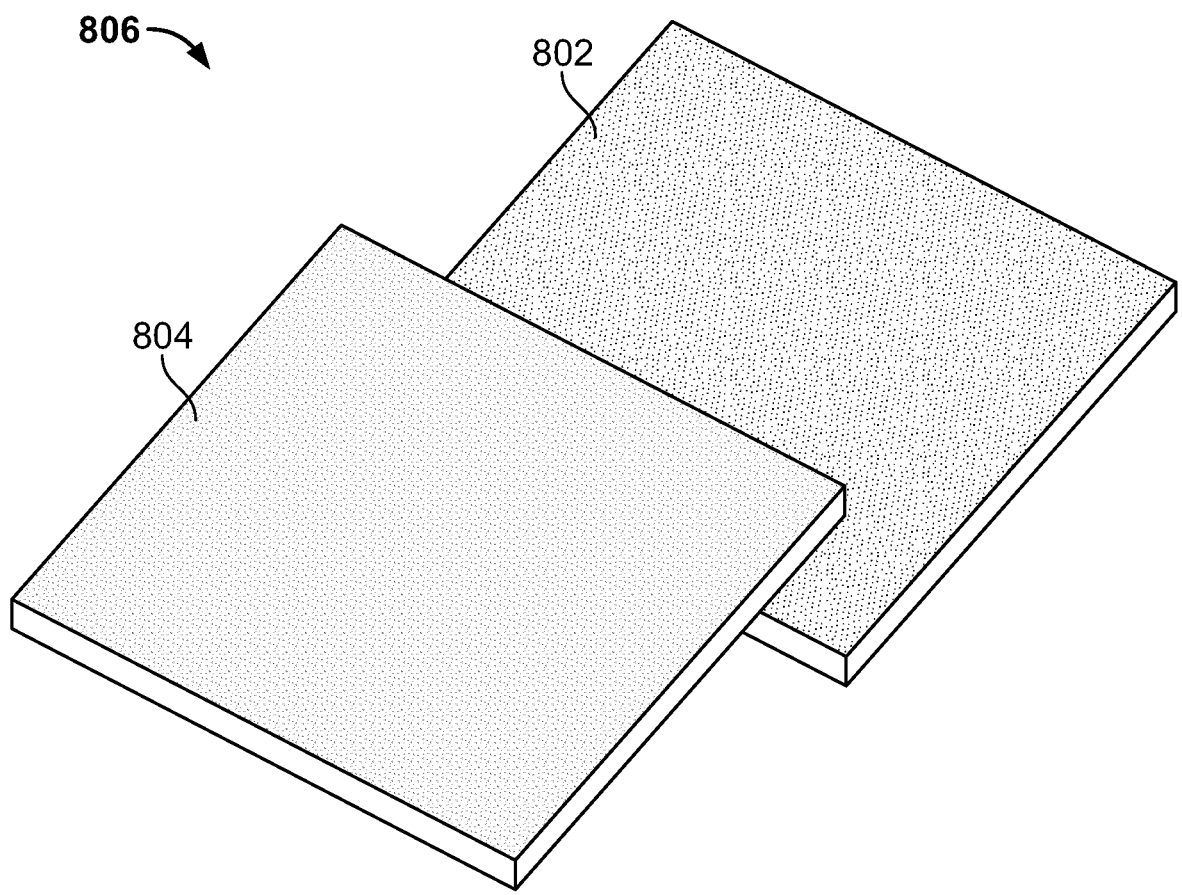
FIG. 8 illustrates another example press plate having an example liquid-resistant layer and an example permeable layer in accordance with the teachings herein.

FIG. 8 illustrates an example liquid-resistant layer 802 and an example permeable layer 804 of an example press plate 806 in accordance with the teachings herein. As described in further detail below, the press plate 806 including the liquid-resistant layer 802 and the permeable layer 804 form a portion (e.g., a first portion) of the press plate 806 that is composed of permeable material(s) to enable a hot press (e.g., a hot press 900 of FIG. 9) to form a panel (e.g., the panel 404 of FIGS. 4-7) and remove gas and/or vapor from the panel as the panel is formed. The press plate 806 removes the gas and/or vapor from the panel to deter and/or impede a portion of a decorative layer (e.g., the decorative layer 602 of FIGS. 6 and 7) that is to be coupled to the panel from separating from the panel. In the illustrated example, the permeable layer 804 is composed of a porous metallic material (e.g., porous aluminum), porous ceramic material, an open-cell polymer foam and/or any other material that enables gas and/or vapor (e.g., water vapor) to traverse through the permeable layer 804 while withstanding the heat and/or pressure applied by the hot press to form the panel. The liquid-resistant layer 802 is composed of, for example, biaxial stretch polytetrafluoroethylene (e.g., Teflon, Gore-Tex®) and/or any other material that enables gas and/or vapor (e.g., water vapor) to traverse through the liquid-resistant layer 802 and deters and/or impedes resin (e.g., uncured liquid resin of the panel 404) from traversing through the liquid-resistant layer 802.

Figure 9:
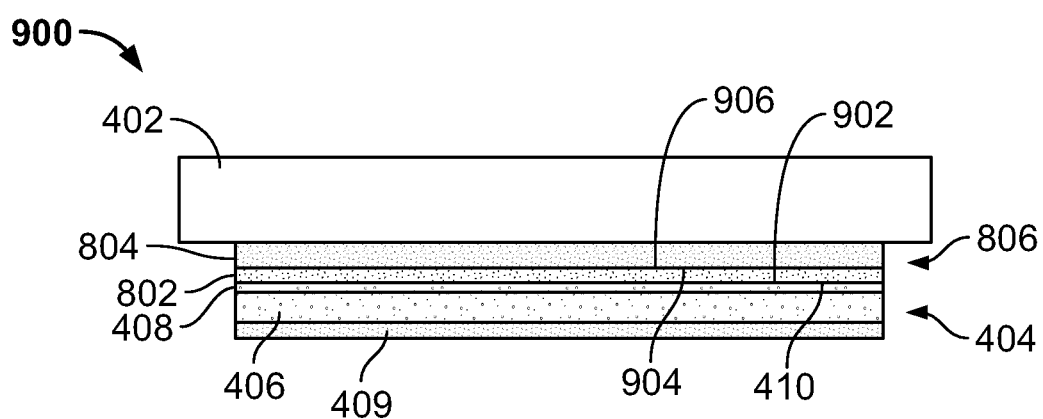
FIG. 9 illustrates another example hot press having the liquid-resistant layer and the permeable layer of FIG. 8 in accordance with the teachings herein.

FIG. 9 illustrates another example hot press 900 having the liquid-resistant layer 802 and the permeable layer 804 in accordance with the teachings herein. The hot press 900 applies heat and/or pressure to the panel 404 to form the panel 404. In the illustrated example, the hot press 900 removes gas and/or vapor from the panel 404 as the hot press 400 contacts the panel 404 to deter and/or impede a portion of a decorative layer (e.g., the decorative layer 602 of FIGS. 6 and 7) that is to be coupled to the panel 404 from separating from the panel 404. The example base plate 402 and the example panel 404 (e.g., the example core layer 406 and the example reinforcing layers 408, 409) of FIG. 9 are substantially similar or identical to those components having the same reference numbers in FIGS. 4 and 5.

To form the panel 404, the hot press 900 of the illustrated example cures resin of the reinforcing layers 408, 409 to bond and/or couple the core layer 406 and the fiber reinforcing layer of the reinforcing layers 408, 409. To cure the resin of the panel 404, the press plate 806 of the example hot plate 900 engages the surface 410 (e.g., a first surface) of the panel 404. For example, a surface 902 (e.g., a second surface) of the liquid-resistant layer 802 engages and/or contacts the surface 410 of the panel 404, a surface 904 (e.g., a third surface) of the permeable layer 804 engages and/or contacts a surface 906 (e.g., a fourth surface) of the liquid-resistant layer 802 opposite the surface 902, and the base plate 402 engages and/or contacts the permeable layer 804 opposite the liquid-resistant layer 802. The base plate 402 applies heat and/or pressure, via the permeable layer 804 and the liquid-resistant layer 802, to form the panel 404 by curing the resin of the panel 404. For example, another plate (e.g., a hydraulic plate) engages the reinforcing layer 409 to enable the base plate 402 to apply the pressure to the opposing reinforcing layer 408.

The permeable layer 804 and the liquid-resistant layer 802 enable gas and/or vapor to be removed from the panel 404 as the hot press 900 is forming the panel 404. For example, as the hot press 900 applies heat and/or pressure to the panel 404, gas and/or vapor (e.g., water vapor) is emitted from the panel 404, traverses through the permeable layer 804 and the liquid-resistant layer 802, and is vented away from the panel 404. In some examples, a vacuum is applied to the hot press 900 and/or the panel 404 to further enable and/or to expedite curing of the resin and/or removal of the gas and/or vapor from the panel 404. By removing the gas and/or vapor from the panel 404 before the decorative layer is coupled to the surface 410 of the panel 404, the permeable layer 804 and the liquid-resistant layer 802 of the example hot press 400 deters and/or impedes a portion of a decorative layer (e.g., the decorative layer 602 of FIGS. 6 and 7) from separating from the panel 404 (e.g., the hot press 900 removes the gas and/or vapor to deter and/or impede bubbling of the decorative layer 602).

Further, because the liquid-resistant layer 802 is composed of material that deters and/or impedes liquid resin from traversing therethrough, the liquid-resistant layer 802 may collect and/or trap any liquid resin that is emitted from the panel 404 as the panel 404 is being formed. Thus, the liquid-resistant layer 802 deters and/or impedes the resin from reaching the permeable layer 804, thereby deterring and/or impeding the resin from reducing the porosity of the permeable layer 804 and/or otherwise impeding the permeable layer 804 from venting the gas and/or vapor away from the panel 404. As a result, the permeable layer 804 utilized to form the panel 404 may be utilized to form another panel (e.g., a panel substantially similar or identical to the panel 404) after the panel 404 is formed. For example, the liquid-resistant layer 802 that has collected resin during the formation of the panel 404 may be replaced with another liquid-resistant layer (e.g., a liquid-resistant layer substantially similar or identical to the liquid-resistant layer 802). Thus, the base layer 402 and the permeable layer 804 of the example hot press 900 may be utilized repeatedly to form a plurality of panels.

Figure 10:
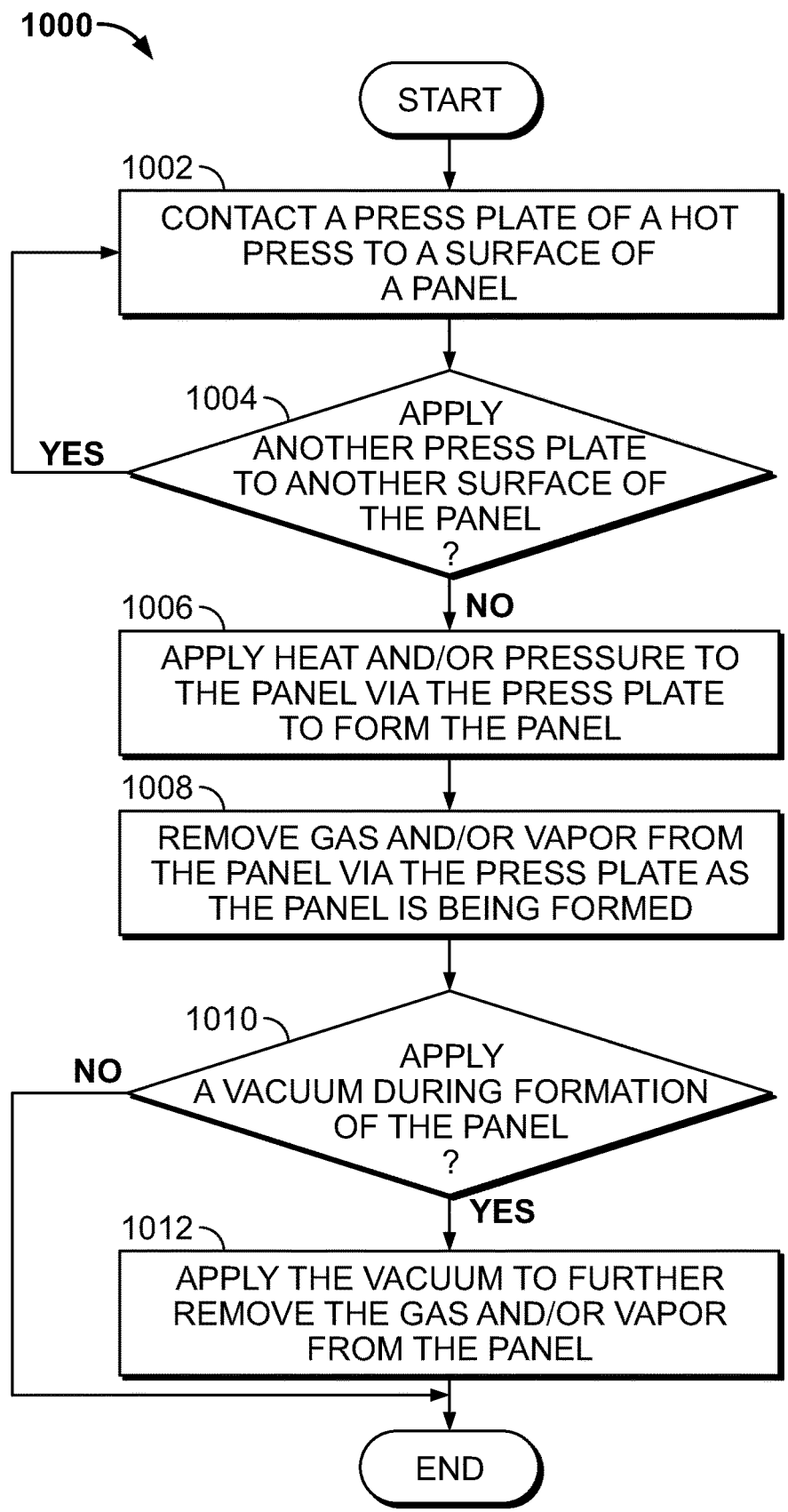
FIG. 10 is a flowchart representative of an example method to remove gas and/or vapor from a panel as the panel is formed via the hot press of FIGS. 4, 5 and/or 9 in accordance with the teachings herein.

FIG. 10 is a flowchart representative of an example method 1000 to remove gas and/or vapor from an example panel as the example panel is formed in accordance with the teachings herein. Although the example method 1000 is described with reference to the flowchart illustrated in FIG. 10, many other methods for removing the gas and/or vapor from the panel as the panel is formed may alternatively be used. For example, the order of execution of the blocks may be changed, and/or some of the blocks described changed, eliminated, and/or combined.

The method 1000 for removing gas and/or vapor from a panel as the panel is formed is discussed in connection with the hot press 400 of FIG. 4, the panel 404 of FIGS. 4-5 and 9, the hot press 500 of FIG. 5 and/or the hot press 900 of FIG. 9. Further, because the method 1000 may refer to the hot press 400 of FIG. 4, the panel 404 of FIGS. 4-7 and 9, the hot press 500 of FIG. 5 and/or the hot press 900 of FIG. 9, components identified in FIGS. 4-7 and 9 having functions substantially similar or identical to the functions of components described below will not be described in detail again. Instead, the same reference numbers will be used for like structures.

The example method 1000 disclosed herein starts at block 1002 by contacting a press plate (e.g., the press plate 300 of FIGS. 3-5, the press plate 502 of FIG. 5, the press plate 806 of FIGS. 8-9) of a hot press (e.g., the hot press 400 of FIG. 4, the hot press 500 of FIG. 5, the hot press 900 of FIG. 9) to a surface (e.g., the surface 410 of FIGS. 4-5 and 9, the surface 600 of FIG. 6, the surface 700 of FIG. 7) of a panel (e.g., the panel 404 of FIGS. 4-7 and 9). At block 1004, the example method 1000 includes determining whether to apply another press plate to another surface of the panel. If another press plate (e.g., the press 502 of FIG. 5) and another surface (e.g., the surface 506 of FIG. 5) are identified, block 1002 is repeated for the other press plate and the other surface of the panel. Blocks 1002, 1004 are repeated until no other press plates and surfaces of the panel are identified.

At block 1006, the hot press applies heat and/or pressure to the panel via the press plate to form the panel. For example, the hot press applies a pressure of about between 25 psi (172.4 to kPa) and 30 psi (206.8 to kPa) to form the panel. Further, at block 1008, the press plate removes gas and/or vapor from the panel (e.g., from the core layer 406 of the panel 404 of FIGS. 4-7 and 9) as the panel is being formed by the hot press. In some examples, the press plate (e.g., the press plate 300 of FIGS. 3-5) removes the gas and/or vapor from the panel by venting the gas and/or vapor away from the panel via one or more venting channels (e.g., the venting channels 306, 308 of FIG. 3), permeable material (e.g., the first portion 302 of the press plate 300 of FIG. 3) disposed in the venting channels, and/or protrusions composed of permeable material. In other examples, the press plate (e.g., the press plate 806 of FIGS. 8 and 9) removes the gas and/or vapor from the panel by venting the gas and/or vapor away from the panel via a liquid-resistant layer (e.g., the liquid-resistant layer 802 of FIGS. 8 and 9) and a permeable layer (e.g., the permeable layer 804 of FIGS. 8 and 9).

At block 1010, the example method 1000 includes determining whether to apply a vacuum during formation of the panel. If the vacuum is to be applied, the example method 1000 including applying the vacuum to the hot press and/or the panel (e.g., as the hot press applies heat and/or pressure to the panel) to further remove and/or to expedite removal of the gas and/or vapor from panel (block 1012).

Figure 11:
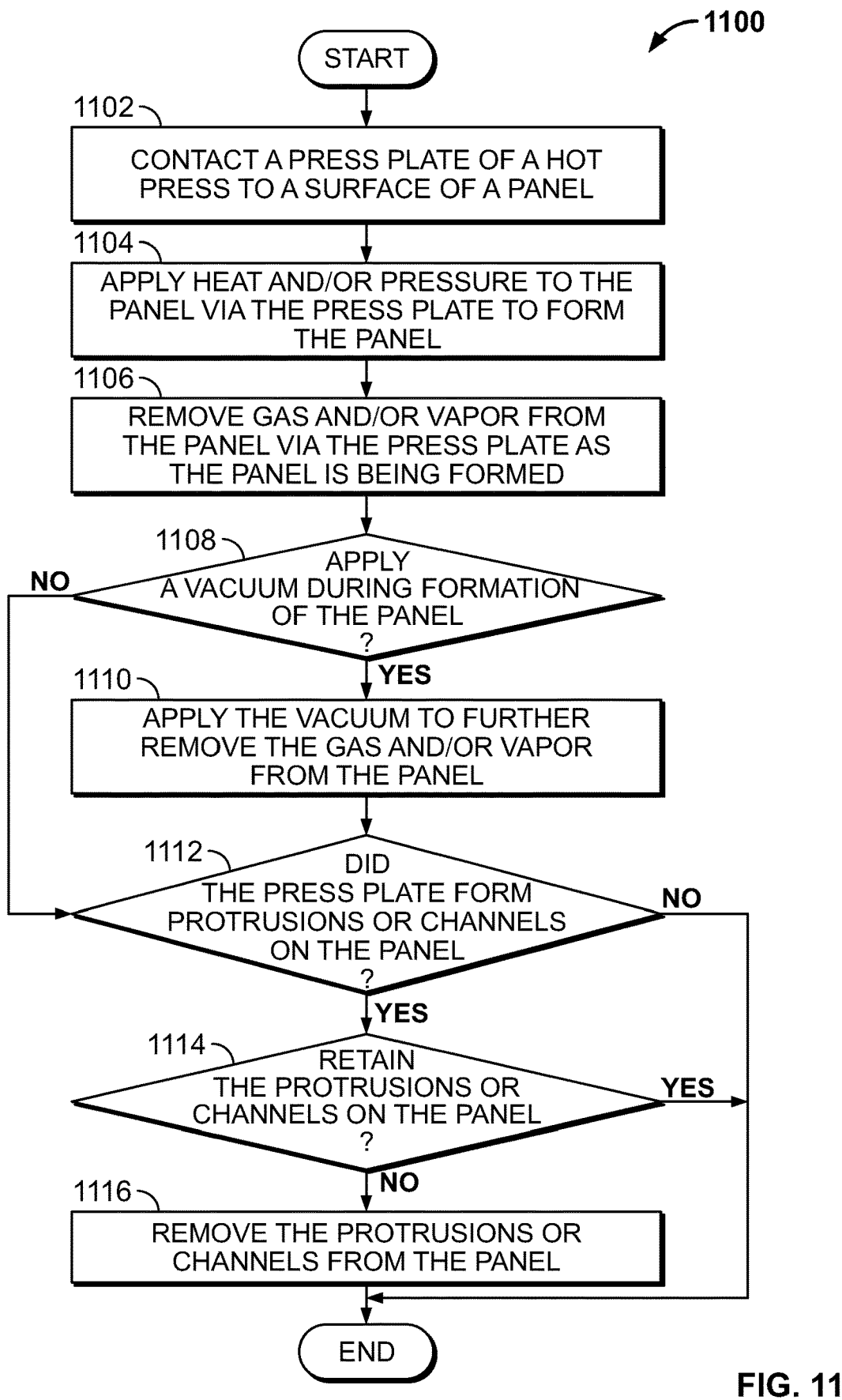
FIG. 11 is a flowchart representative of an example method of removing gas and/or vapor from a panel while forming the panel via the hot press of FIGS. 4 and/or 5 in accordance with the teachings herein.

FIG. 11 is a flowchart representative of an example method 1100 for removing gas and/or vapor from an example panel while forming the example panel via an example hot press in accordance with the teachings herein. Although the example method 1100 is described with reference to the flowchart illustrated in FIG. 11, many other methods for removing the gas and/or vapor from the panel while forming the panel via the hot press may alternatively be used. For example, the order of execution of the blocks may be changed, and/or some of the blocks described changed, eliminated, and/or combined.

The method 1100 for removing gas and/or vapor from a panel while forming the panel via a hot press is discussed in connection with the press plate 300 of FIGS. 3-5, the hot press 400 of FIG. 4, example panel 404 of FIGS. 4-7 and/or the hot press 500 of FIG. 5. Further, because the method 1100 may refer to the press plate 300 of FIGS. 3-5, the hot press 400 of FIG. 4, the panel 404 of FIGS. 4-7 and/or the hot press 500 of FIG. 5, components identified in FIGS. 3-7 having functions substantially similar or identical to the functions of components described below will not be described in detail again. Instead, the same reference numbers will be used for like structures.

The example method 1100 disclosed herein starts at block 1102 by contacting a press plate (e.g., the press plate 300 of FIGS. 3-5, the press plate 502 of FIG. 5) of a hot press (e.g., the hot press 400 of FIG. 4, the hot press 500 of FIG. 5) to a surface (e.g., the surface 410 of FIG. 4, the surface 600 of FIG. 6, the surface 700 of FIG. 7) of a panel (e.g., the panel 404 of FIGS. 4-7). At block 1104, the hot press applies heat and/or pressure to the panel via the press plate to form the panel. Further, at block 1106, the press plate removes gas and/or vapor from the panel as the panel is being formed by the hot press. For example, the press plate removes the gas and/or vapor from the panel by venting the gas and/or vapor away from the panel via one or more venting channels (e.g., the venting channels 306, 308 of FIG. 3), permeable material (e.g., the first portion 302 of the press plate 300 of FIG. 3) disposed in the venting channels, and/or protrusions composed of permeable material.

At block 1108, the example method 1100 includes determining whether to apply a vacuum during formation of the panel. If the vacuum is to be applied, the example method 1100 including applying the vacuum to the hot press and/or the panel to further remove and/or to expedite removal of the gas and/or vapor from panel (block 1012).

Upon applying the vacuum or determining that the vacuum is not to be applied, the example method 1100 identifies whether the press plate formed protrusions (e.g., the protrusions 702, 704 of FIG. 7) or channels on the panel during formation of the panel (block 1112). If protrusions are not formed on the panel, the example method 1100 ends. If protrusions or channels are formed on the panel (e.g., on the surface 700 of the panel 404 of FIG. 7), the example method determines whether to retain the protrusions or channels on the panel (block 1114). If the protrusions are to be retained, the example method 1100 ends. If the protrusions or channels are not to be retained, the protrusions or channels are removed via a secondary manufacturing process (e.g., sanding, cutting, etc.) from the panel upon which the example method 1100 ends (block 1116).

Figure 12:
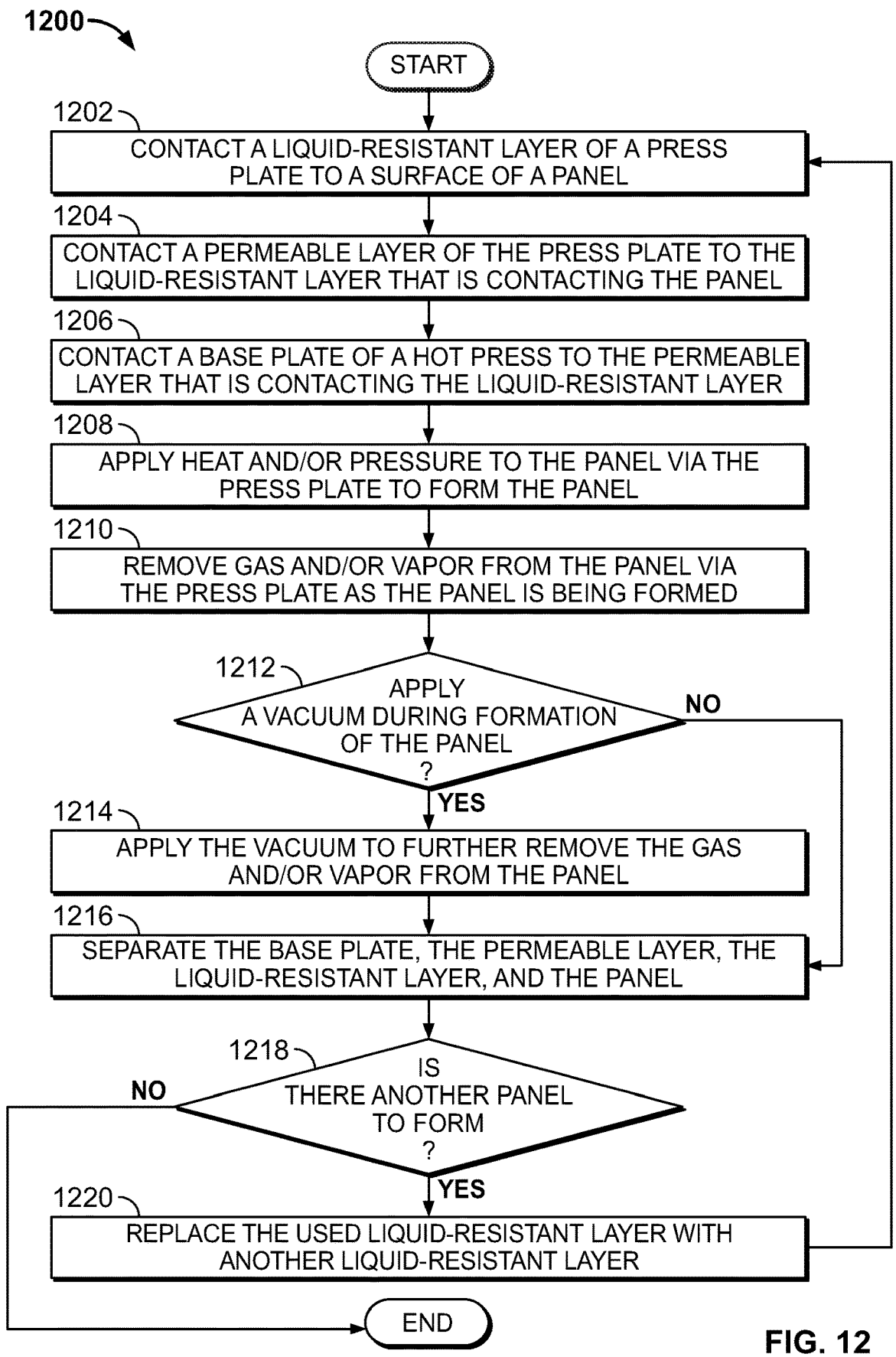
FIG. 12 is a flowchart representative of an example method of removing gas and/or vapor from panel(s) while forming the panel(s) via the hot press of FIG. 9 in accordance with the teachings herein.

FIG. 12 is a flowchart representative of another example method 1200 for removing gas and/or vapor from an example panel while forming the example panel via an example hot press in accordance with the teachings herein. Although the example method 1200 is described with reference to the flowchart illustrated in FIG. 12, many other methods for removing the gas and/or vapor from the panel while forming the panel via the hot press may alternatively be used. For example, the order of execution of the blocks may be changed, and/or some of the blocks described changed, eliminated, and/or combined.

The method 1200 for removing gas and/or vapor from a panel while forming the panel via a hot press is discussed in connection with the press plate 806 of FIGS. 8 and 9, the hot press 900 of FIG. 9 and/or the panel 404 of FIG. 9. Further, because the method 1200 may refer to the press plate 806 of FIGS. 8 and 9, the hot press 900 of FIG. 9 and/or the panel 404 of FIG. 9, components identified in FIGS. 8 and 9 having functions substantially similar or identical to the functions of components described below will not be described in detail again. Instead, the same reference numbers will be used for like structures.

The example method 1200 disclosed herein starts at block 1202 by contacting a liquid-resistant layer (e.g., the liquid-resistant layer 802 of FIGS. 8 and 9) of a press plate (e.g., the press plate 806 of FIGS. 8 and 9) to a surface (e.g., the surface 410 of FIG. 9) of a panel (e.g., the panel 404 of FIG. 9). For example, a surface (e.g., the surface 902) of the liquid-resistant layer engages the surface of the panel. At block 1204, a permeable layer (e.g., the permeable layer 804 of FIGS. 8 and 9) of the press plate contacts the liquid-resistant layer that is in contact with the panel. For example, a surface (e.g., the surface 906 of FIG. 9) of the permeable layer engages another surface (e.g., the surface 904 of FIG. 9) of the liquid-resistant layer. Further, at block 1206, a base plate (e.g., the base plate 402 of FIG. 9) of a hot press (e.g., the hot press 900 of FIG. 9) contacts the permeable layer that is in contact with the liquid-resistant layer.

At block 1208, the hot press applies heat and/or pressure to the panel via the permeable layer and the liquid resistant layer of the press plate to form the panel. Gas and/or vapor (e.g., water vapor) is removed from the panel via the liquid-resistant layer and the permeable layer of the press plate as the panel is formed (block 1210). Further, the example method 1200 includes determining whether a vacuum is to be applied during formation of the panel (block 1212). If a vacuum is to be applied, the example method 1200 includes applying the vacuum to the hot press and/or the panel to further remove and/or to expedite removal of the gas and/or vapor from panel (block 1214).

Upon forming the panel and removing the gas and/or vapor from the panel, the base plate, the permeable layer, and the liquid-resistant layer of the hot press and the panel are separated (block 1216). At block 1218, the example method 1200 includes determining whether there is another panel (e.g., a panel substantially similar or identical to the panel 404 of FIG. 9) to be formed. If there is another panel, the liquid-resistant layer that was utilized to form the panel is replaced with another liquid-resistant layer (e.g., a liquid-resistant layer substantially similar or identical to the liquid-resistant layer 802 of FIGS. 8 and 9) that is to be utilized to form the other identified panel. Subsequently, blocks 1202, 1204, 1206, 1208, 1210, 1212, 1214, 1216 are repeated to form the other panel. Blocks 1202, 1204, 1206, 1208, 1210, 1212, 1214, 1216, 1218, 1220 are repeated until no other panels are identified to be formed.

Although certain example methods and apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
a first press plate of a hot press to engage a first surface of a panel, the hot press to apply heat to the panel via the first press plate to cure resin of the panel, the first press plate including:
a first portion including a permeable material to remove at least one of gas or vapor from the panel to deter the at least one of gas or vapor from exerting a pressure on a decorative layer to be coupled to the panel to deter separation of a portion of the decorative layer from the panel; and
a second portion including a second material, the first portion and the second portion forming an outer surface of the first press plate, the second material different than the permeable material, the second portion defining a venting channel, the first portion filling the venting channel so that at least a portion of the outer surface formed by the first portion and the second portion is flat, the at least the portion of the outer surface to deter the first press plate from forming protrusions on the first surface of the panel.

2. The apparatus of claim 1, wherein the permeable material enables water vapor to traverse therethrough and deters liquid resin from traversing therethrough.

3. The apparatus of claim 1, further including a coating of moisture absorption material applied to the first press plate that captures moisture to further deter the at least one of gas or vapor from exerting the pressure on the decorative layer to be coupled to the panel.

4. The apparatus of claim 1, wherein the permeable material is to contact the panel when the first press plate engages the panel.

5. The apparatus of claim 4, wherein the second material includes a low permeability material that impedes water vapor and liquid resin from traversing therethrough.

6. The apparatus of claim 5, wherein the venting channel extends to an outer edge of the first press plate to enable the at least one of gas or vapor to move away from the panel.

7. An apparatus comprising:
a first press plate of a hot press to engage a first surface of a panel, the hot press to apply heat to the panel via the first press plate to cure resin of the panel, a first portion of the first press plate including:
a permeable material to remove at least one of gas or vapor from the panel to deter the at least one of gas or vapor from exerting a pressure on a decorative layer to be coupled to the panel to deter separation of a portion of the decorative layer from the panel; and
a liquid-resistant layer to engage the first surface of the panel, the permeable material and the liquid-resistant layer to enable the at least one of gas or vapor to traverse therethrough to enable the at least one of gas or vapor to be removed from the panel, the liquid-resistant layer to impede liquid resin of the panel from traversing to the permeable material to impede the liquid resin from deterring the at least one of gas or vapor from traversing through the permeable material wherein the liquid-resistant layer is composed of biaxial stretch polytetrafluoroethylene and the permeable material is composed of at least one of a porous metallic material, a porous ceramic material or an open-cell polymer foam.

8. The apparatus of claim 1, further including a second press plate of the hot press to engage a second surface of the panel opposite the first surface to further remove the at least one of gas or vapor from the panel.

9. An apparatus comprising:
means for curing; and
means for engaging a surface of a panel, the means for curing to apply heat to the panel via the means for engaging to cure resin of the panel, the means for engaging including:
means for removing at least one of gas or vapor from the panel to deter the at least one of gas or vapor from exerting a pressure on a means for decorating to be coupled to the panel to deter separation of a portion of the means for decorating from the panel;
means for impeding a fluid flow, the means for removing and the means for impeding forming an outer surface of the means for engaging; and
venting means defined by the means for impeding the fluid flow, the means for removing filling the venting means so that at least a portion of the outer surface formed by the means for removing and the means for impeding is flat, the at least the portion of the outer surface to deter the means for engaging from forming protrusions on the surface of the panel.

10. A method comprising:
contacting a first press plate of a hot press to a first surface of a panel, a first portion of the first press plate including a permeable material filling one or more venting channels, the venting channels defined by a second material of the first press plate, the first portion of the first press plate and the second material of the first press plate forming an outer surface of the first press plate, at least a portion of the outer surface formed by the first portion and the second material being flat, the at least the portion of the outer surface to deter the first press plate from forming protrusions on the first surface of the panel, the permeable material to enable at least one of gas or vapor to traverse therethrough, the second material different than the permeable material;
applying heat to the panel, via the first press plate, to cure resin of the panel; and
removing at least one of gas or vapor from the panel via the permeable material of the first press plate to deter the at least one of gas or vapor from exerting a pressure on a decorative layer to be coupled to the panel to deter separation of a portion of the decorative layer from the panel.

11. The method of claim 10, wherein contacting the first press plate of the hot press to the first surface of the panel causes the first press plate to engage the panel to enable the at least one of gas or vapor to be removed from the panel via the permeable material of the first press plate.

12. The method of claim 10, further including applying a vacuum to the panel to further enable the at least one of gas or vapor to be removed from the panel.

13. The method of claim 10, wherein removing the at least one of gas or vapor from the panel via the permeable material includes venting the at least one of gas or vapor through the permeable material, the one or more venting channels defined by the outer surface of the first press plate, the venting channels extending to an outer edge of the first press plate to enable the at least one of gas or vapor to vent away from the panel.

14. The method of claim 10, further including:
contacting a second press plate of the hot press to a second surface of the panel opposite the first surface, a portion of the second press plate composed of permeable material; and
applying heat to the panel via the second press plate to further remove the at least one of gas or vapor from the panel via the permeable material of the second press plate to deter separation of the portion of the decorative layer from the panel.

15. The apparatus of claim 1, wherein a permeability of the second material is less than a permeability of the permeable material.

16. The apparatus of claim 9, wherein the means for removing includes a first material and the means for impending impeding includes a second material, the second material less permeable than the first material.

17. An apparatus comprising:
a first press plate of a hot press to engage a first surface of a panel, the hot press to apply heat to the panel via the first press plate to cure resin of the panel, the first press plate including:
a first portion including a permeable material to remove at least one of gas or vapor from the panel to deter the at least one of gas or vapor from exerting a pressure on a decorative layer to be coupled to the panel to deter separation of a portion of the decorative layer from the panel; and
a second portion including a second material, the second material different than the permeable material, the second portion defining a venting channel, the first portion partially filling the venting channel to enable the venting channel to form protrusions on the first surface of the panel.

18. The apparatus of claim 17, further including a second press plate of the hot press to engage a second surface of the panel opposite the first surface.

19. The apparatus of claim 17, wherein the venting channel extends to an outer edge of the first press plate to enable the at least one of gas or vapor to move away from the panel.

20. An apparatus comprising:
means for curing; and
means for engaging a surface of a panel, the means for curing to apply heat to the panel via the means for engaging to cure resin of the panel, the means for engaging including:
means for removing at least one of gas or vapor from the panel to deter the at least one of gas or vapor from exerting a pressure on a means for decorating to be coupled to the panel to deter separation of a portion of the means for decorating from the panel;
means for impeding a fluid flow; and
venting means defined by the means for impeding the fluid flow, the means for removing partially filling the venting means to enable the venting means to form protrusions on the surface of the panel.

* * * * *